United States Patent
Wood et al.

(10) Patent No.: US 11,175,388 B1
(45) Date of Patent: Nov. 16, 2021

(54) DIGITAL COHERENT LIDAR WITH ARBITRARY WAVEFORMS

(71) Applicant: Insight Photonic Solutions, Inc., Lafayette, CO (US)

(72) Inventors: Christopher Wood, Lafayette, CO (US); Jason Ensher, Lafayette, CO (US)

(73) Assignee: INSIGHT LIDAR, INC., Lafayette, CO (US)

( * ) Notice: Subject to any disclaimer, the term of this patent is extended or adjusted under 35 U.S.C. 154(b) by 552 days.

(21) Appl. No.: 16/198,483

(22) Filed: Nov. 21, 2018

Related U.S. Application Data

(60) Provisional application No. 62/589,635, filed on Nov. 22, 2017.

(51) Int. Cl.
*G01S 7/00* (2006.01)
*G01S 7/4911* (2020.01)
*G01S 17/34* (2020.01)

(52) U.S. Cl.
CPC ............ *G01S 7/4911* (2013.01); *G01S 17/34* (2020.01)

(58) Field of Classification Search
USPC ...................................................... 356/4.01
See application file for complete search history.

(56) References Cited

U.S. PATENT DOCUMENTS

| | | | |
|---|---|---|---|
| 10,348,051 B1 * | 7/2019 | Shah | G01S 17/34 |
| 10,527,726 B2 * | 1/2020 | Bartlett | G01S 7/4814 |
| 10,802,120 B1 * | 10/2020 | LaChapelle | G01S 7/4818 |
| 10,868,405 B1 * | 12/2020 | Ensher | H01S 5/0617 |
| 2007/0024849 A1 * | 2/2007 | Carrig | G01N 21/21 356/337 |

(Continued)

FOREIGN PATENT DOCUMENTS

| | | | | |
|---|---|---|---|---|
| WO | WO-2015044370 A1 * | 4/2015 | | G01S 7/4802 |
| WO | WO-2018093435 A2 * | 5/2018 | | H01S 5/183 |

(Continued)

OTHER PUBLICATIONS

J. Petit, B. Stottelaar, M. Feiri, and F. Kargl. Remote Attacks on Automated Vehicles Sensors: Experiments on Camera and LiDAR. Blackhat.com, pp. 1-13, 2015.

(Continued)

*Primary Examiner* — James R Hulka
(74) *Attorney, Agent, or Firm* — Grant Steyer

(57) ABSTRACT

A LiDAR system comprising a laser source configured to output electromagnetic radiation based on an input signal and circuitry configured to supply the input signal to the laser source to control electromagnetic radiation output by the laser source, such that the laser source outputs a waveform including a plurality of output states. The laser source outputs electromagnetic radiation having a particular wavelength during the output states. Each of the plurality of output states is separated in time from neighboring output states of the plurality of output states by a time span. The particular wavelength of the electromagnetic radiation for a first output state of the plurality of output states is different from the particular wavelength of electromagnetic radiation for a second output state of the plurality of output states.

41 Claims, 18 Drawing Sheets

(56) References Cited

U.S. PATENT DOCUMENTS

| | | | | |
|---|---|---|---|---|
| 2008/0110994 | A1* | 5/2008 | Knowles | G06K 7/10544 235/462.42 |
| 2008/0249884 | A1* | 10/2008 | Knowles | G02B 27/48 705/23 |
| 2009/0101719 | A1* | 4/2009 | Knowles | A47F 9/046 235/462.42 |
| 2010/0246610 | A1* | 9/2010 | Mirov | H01S 3/10092 372/10 |
| 2016/0087407 | A1* | 3/2016 | Moloney | H01S 5/34 372/18 |
| 2017/0133825 | A1* | 5/2017 | Kilen | H01S 5/065 |
| 2017/0308117 | A1* | 10/2017 | Park | G06F 3/017 |
| 2018/0100929 | A1* | 4/2018 | O'Keeffe | G01S 17/10 |
| 2018/0316159 | A1* | 11/2018 | Kilen | H01S 5/187 |
| 2019/0011541 | A1* | 1/2019 | O'Keeffe | G01S 17/10 |
| 2019/0011558 | A1* | 1/2019 | Crouch | G08G 1/16 |
| 2019/0025412 | A1* | 1/2019 | O'Keeffe | G01S 17/10 |
| 2020/0284883 | A1* | 9/2020 | Ferreira | G01S 7/4816 |
| 2021/0021099 | A1* | 1/2021 | Vizbaras | G01N 21/39 |

FOREIGN PATENT DOCUMENTS

| | | | | |
|---|---|---|---|---|
| WO | WO-2018122339 | A1 * | 7/2018 | G01S 17/34 |
| WO | WO-2019149815 | A1 * | 8/2019 | H01S 5/0014 |
| WO | WO-2020110779 | A1 * | 6/2020 | G01S 7/491 |
| WO | WO-2020205450 | A1 * | 10/2020 | G01S 17/34 |

OTHER PUBLICATIONS

H. Shin, D. Kim, Y. Kwon, and Y. Kim, "Illusion and Dazzle: Adversarial Optical Channel Exploits Against Lidars for Automotive Applications," Proc. Conference on Cryptographic Hardware and Embedded Systems (CHES) 2017, LNCS, pp. 445-467, 2017.

E. Yeh, J. Choi, N. Prelcic, C. Bhat, and R. Heath, Jr., "Security in automotive radar and vehicular networks," accepted to Microwave Journal, 2016.

Sune R. J. Axelsson, Analysis of Random Step Frequency Radar and Comparison with Experiments, IEEE Transactions on Geoscience and Remote Sensing, vol. 45, No. 4, Apr. 2007.

Meinecke, Marc-Michael et al., Combination of LFMCW and FSK Modulation Principles for Automotive Radar Systems, German Radar Symposium GRS2000, Berlin, Oct. 11-12, 2000.

Christer J. Karlsson et al., Linearization of the frequency sweep of a frequency-modulated continuous-wave semiconductor laser radar and the resulting ranging performance, 3376 Applied Optics / vol. 38, No. 15 / May 20, 1999.

Vincent Crozatier et al., Phase locking of a frequency agile laser, Applied Physics Letters 89, 261115 (2006), Laboratoire Aimé Cotton, CNRS, Université Paris Sud, Bâtiment 505, 91405 Orsay Cedex, France.

* cited by examiner

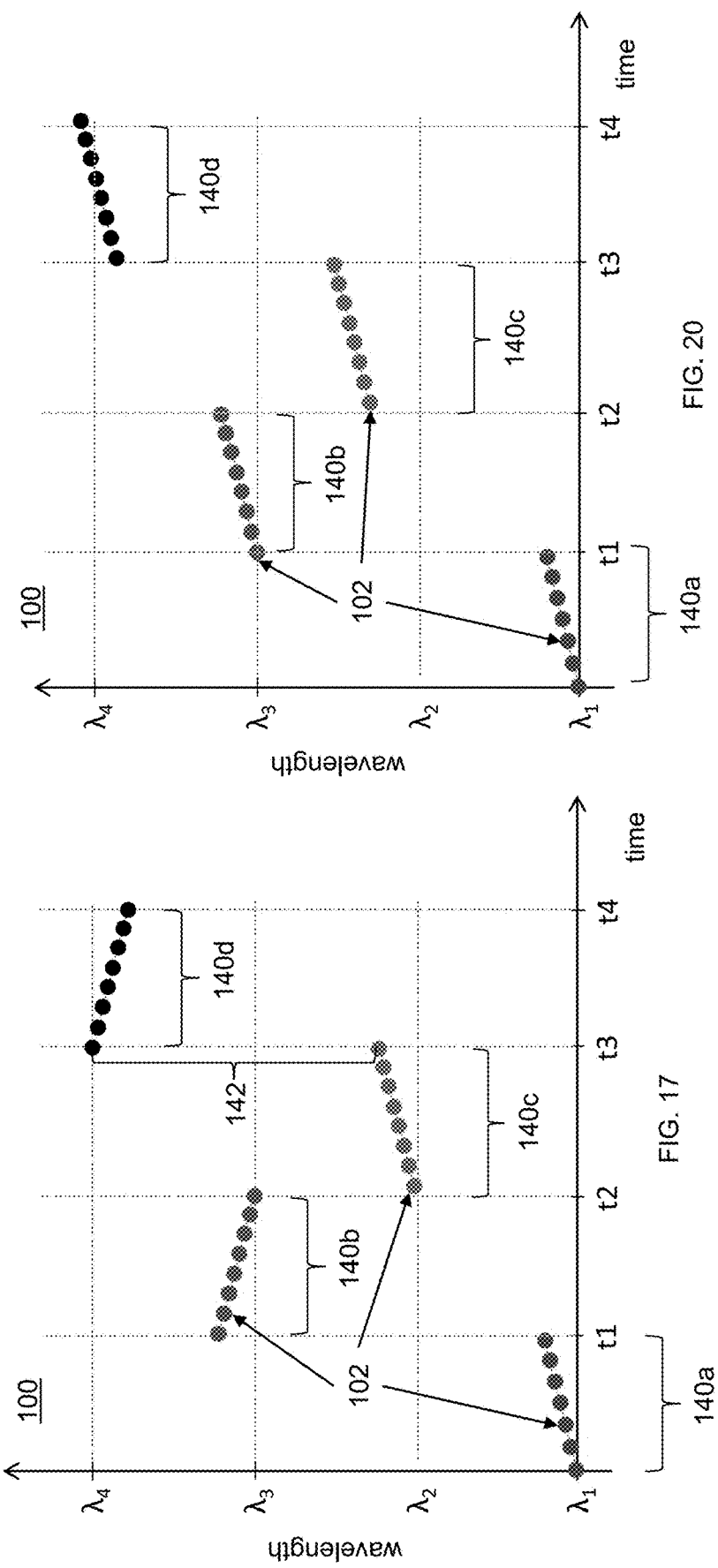

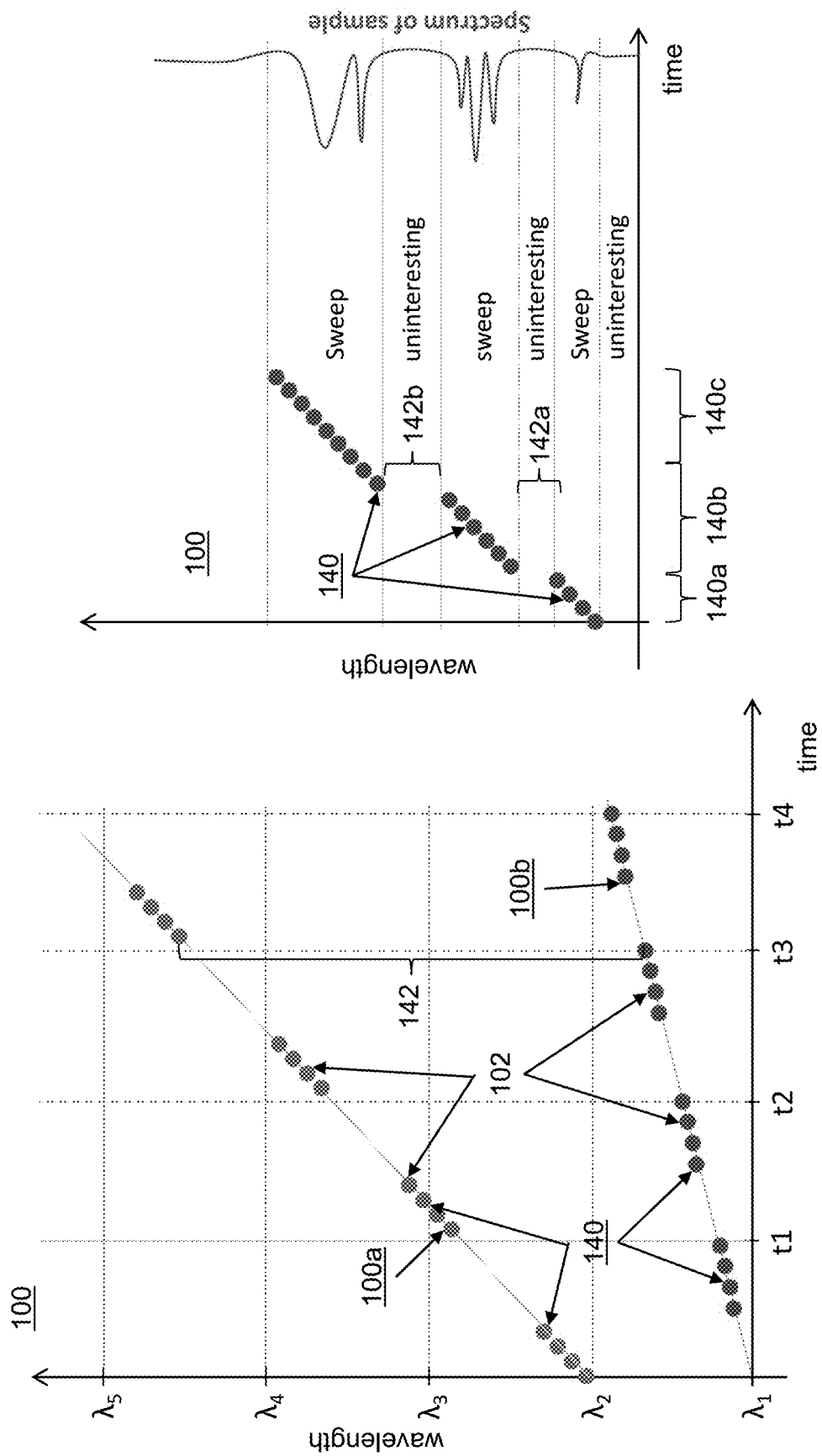

DIGITAL COHERENT LIDAR WITH ARBITRARY WAVEFORMS

TECHNICAL FIELD

The present invention relates generally to LiDAR and more particularly to a system and a method for using advanced, high-speed, digital waveforms with coherent laser radar (LiDAR, or LaDAR) to enhance security and performance.

BACKGROUND

Coherent LiDAR, or Frequency Modulated Continuous Wave (FMCW) LiDAR, or Swept Source LiDAR, represent a broad category of well-known techniques for laser-based distance measurements (ranging), laser-based metrology (measurements), laser-based vibrometry, and combined laser ranging and imaging, among other applications. Coherent LiDAR generally also provides velocity information along with distance.

With the emergence of driver assistance systems, autonomous vehicles (e.g. self-driving cars or trucks), drone-based services, human facial recognition, and other previously unforeseen markets, there is a need for enhanced security measures for the LiDAR system at the core of these applications. Indeed, researchers are already publishing work describing various means of 'hacking' and 'spoofing' attacks on commercial LiDAR and RADAR systems, as has been done with WIFI networks and cellphones. Such attacks involve recognition or measurement of the LiDAR waveforms being transmitted, and subsequent measures directed back towards the LiDAR system in order to mimic, jam, interfere, fool (spoof), or otherwise disable the sensor.

SUMMARY

LiDAR is still vulnerable to the attacks described above, due to an inability to produce the necessary (encrypted or encoded) waveforms with available lasers. This problem is especially true for simple, low cost lasers with high coherence that tend to be used with coherent LiDAR.

There is a need for a coherent LiDAR system with greatly enhanced security, while not conceding other benefits that arise from the coherent approach. By implementing coherent LiDAR with digitally-constructed waveforms, enhanced security can be achieved and in some cases performance can actually improve. For example, Frequency Shift Keying algorithms are known to allow unambiguous determination of position and velocity of an object.

It is an aspect of this invention to implement arbitrary waveforms in the field of coherent LiDAR, by using digitally-constructed waveforms. Digitally-constructed waveforms refer to waveforms generated using a programmable laser, with discrete commands given to the laser at discrete times. Lasers (e.g., unlike sources in radar) have heretofore not been able to produce complicated optical waveforms (i.e., having THz frequencies) or arbitrary waveforms. Specifically, the waveforms used to date in LiDAR are purely analog in nature. This has greatly limited the capability of coherent LiDAR. By contrast with analog waveforms, digital waveforms (sometimes referred to as arbitrary waveforms in RF electronics) may consist of a prescribed, programmed optical frequency vs. time that may be continuous, discontinuous, monotonic or non-monotonic. Properties of digital waveforms may be defined purely by the input signals provided by a computational system such as a computer, DSP, FPGA or the like, and by the speed with which the laser can react. Notably, by implementing coherent LiDAR with software-controlled, programmable lasers, entirely new regimes of high-speed operation are possible.

LiDAR can be distinguished from other ranging techniques (e.g., radar) by the electromagnetic frequencies used. For example, LiDAR uses 'optical' THz frequencies, while radar uses 'electrical' GHz frequencies. Other fields that may benefit from the present invention are OCT, OFDR, interferometric metrology, vibrometry, optical coherence microscopy, etc.

BRIEF DESCRIPTION OF THE DRAWINGS

The annexed drawings, which are not necessarily to scale, show various aspects of the invention in which similar reference numerals are used to indicate the same or similar parts in the various views.

FIG. 17 shows groups of linear-segment waveforms having both positive and negative slopes, including frequency hops and frequency steps.

FIG. 20 shows groups of linear-segment waveforms including frequency hops and frequency steps.

FIG. 23 shows another exemplary waveform.

FIG. 24 shows an exemplary waveform for use with spectroscopy.

DETAILED DESCRIPTION

Figure 1:
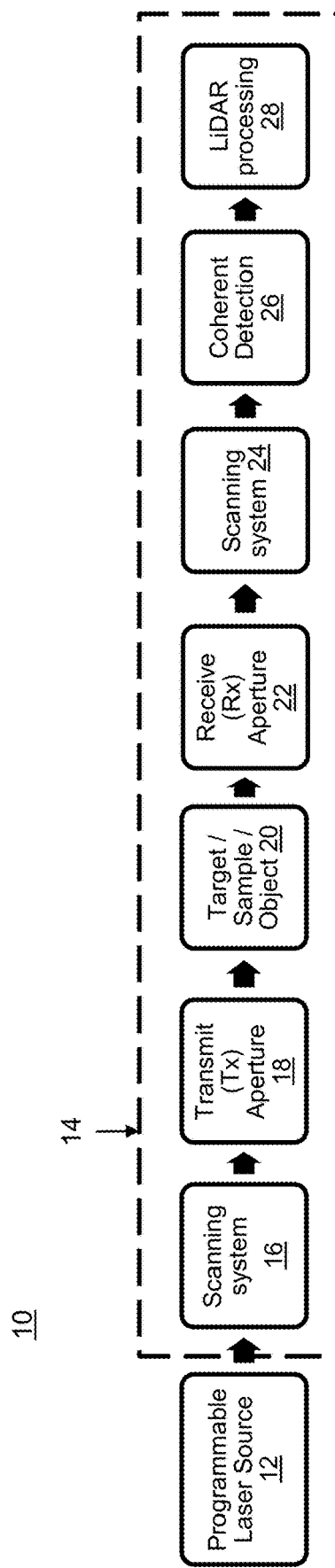
FIG. 1 is a block diagram depicting a generic coherent LiDAR system

The present invention is now described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings. In the text and figures, the terms 'wavelength' and 'frequency' may be used interchangeably, as is common by those skilled in the art.

It is desirous to implement a coherent LiDAR system using waveforms that enhance security, reduce vulnerability, and provide rigorous measures against attacks such as hacking, spoofing, and disabling of the sensor. It is further desirous to implement high-speed, digitally-constructed waveforms that enable lower cost and improved performance of the coherent LiDAR system, relative to analog waveforms commonly used in this field. It is an aspect of this invention that such novel coherent LiDAR implementations can be accomplished using one or more high-speed, software-controlled programmable lasers that produce radar-like waveforms, or arbitrary waveforms, in the optical domain. It is a further aspect of this invention that the instantaneous frequency between the digital steps of a digital waveform can be critical, and shaping, smoothing, or otherwise controlling the programmable laser to this level is beneficial at a minimum and may be required.

FIG. 1 shows a block diagram of a Digital Coherent LiDAR with Arbitrary Waveforms (DCLAW) system 10. The DCLAW system 10 may comprise a common coherent LiDAR system 14, where the traditional laser source is replaced by a programmable laser source 12. The diagram shows the major subsystems within this architecture, roughly in chronological order. For the situation where the transmitted signal and the received signal share the same aperture (Tx aperture 18=Rx aperture 22) this represents a 'monostatic' LiDAR system. When the Tx aperture 18 is different from the Rx aperture 20, then this is generally known as a 'bistatic' LiDAR system. The current invention may be implemented in either a monostatic or a bistatic configuration.

Figure 2:
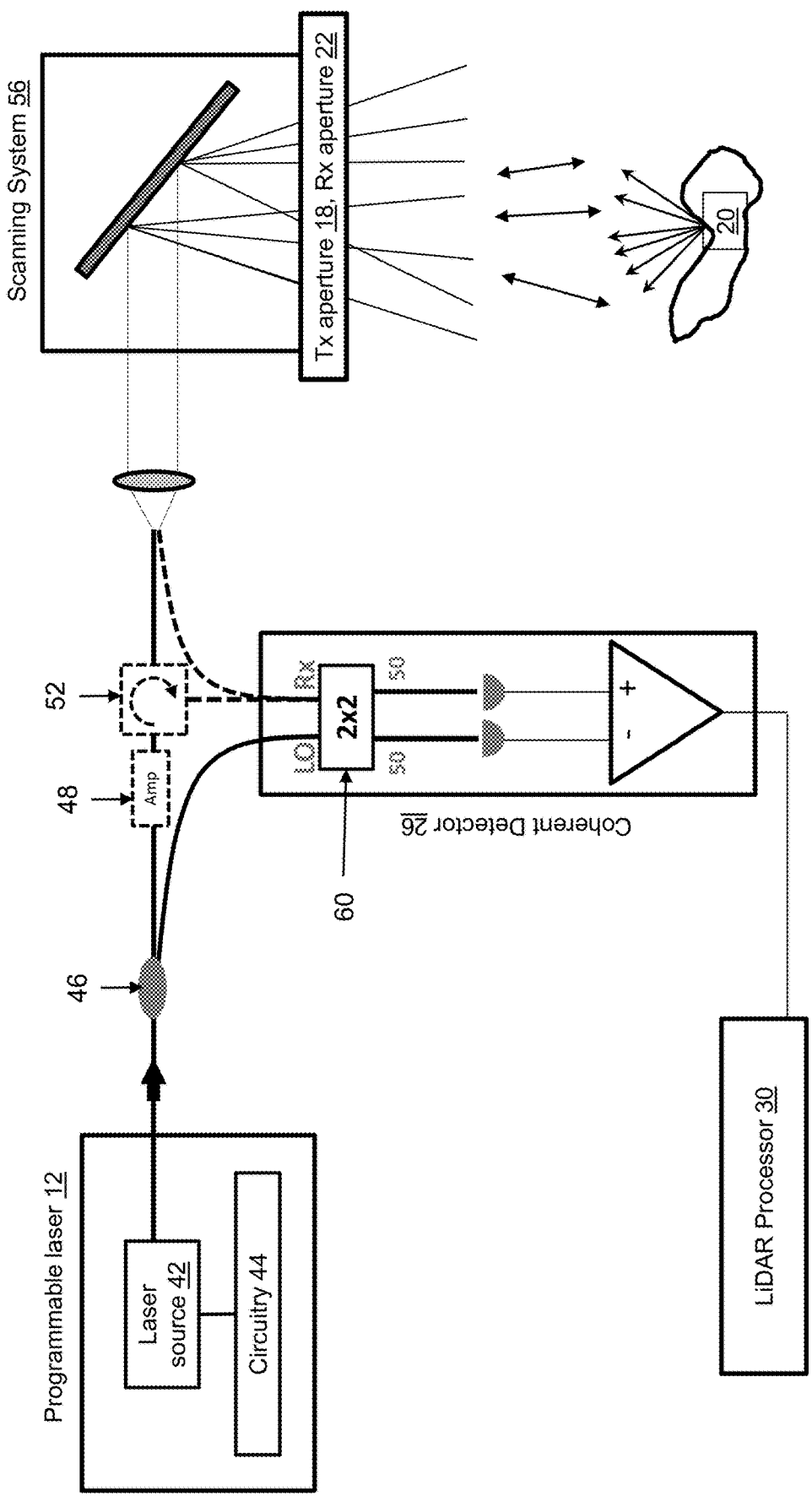
FIG. 2 is a block diagram of a coherent LiDAR system according to an exemplary embodiment of the invention.

FIG. 2 shows a more detailed block diagram (as compared to FIG. 1) for a DCLAW system 10, using the same nomenclature. In this example, a fiber-based or waveguide-based approach is shown. This is consistent with low-cost, small-size requirements of the applications mentioned above. The 'scanning system' that provides motion (beam steering) for the laser beam in systems where imaging is desired, is also shown generically here.

As shown, the programmable laser 12 may comprise a laser source 42 and circuitry 44. As will be understood by one of ordinary skill in the art, the laser source 42 may comprise one or more lasers. In a preferred embodiment, the laser(s) should be appropriately designed or modified to enable the ability to wavelength-tune in a time scale of approximately 1 microsecond or less (e.g., enabling operation for targets located at ranges of approximately 200 meters or less). The laser source(s) 42 may be a semiconductor laser, e.g., a monolithic semiconductor laser, DFB laser, DBR laser, a Vernier-tuned distributed Bragg reflector (VT-DBR) laser, MEMS-tunable semiconductor laser, Vertical Cavity Surface Emitting Laser (VCSEL), VCSEL with Micro-electromechanical systems (MEMS) tuning structures, Vernier-tuned ring laser, Y-branch laser, coupled cavity laser, discrete mode laser, injection-locked or externally-stabilized laser, Super-Structure Grating Distributed Bragg Reflector (SSGDBR) laser, or any other suitable type.

As will be understood by one of ordinary skill in the art, the circuitry 44 may have various implementations. For example, the circuitry 44 may include a processor or any other suitable device, such as a programmable circuit, integrated circuit, memory and I/O circuits, an application specific integrated circuit, microcontroller, complex programmable logic device, other programmable circuits, or the like. The circuitry 44 may also include a non-transitory computer readable medium, such as random-access memory (RAM), a read-only memory (ROM), an erasable programmable read-only memory (EPROM or Flash memory), or any other suitable medium. Instructions for performing the actions and steps described below may be stored in the non-transitory computer readable medium and executed by the circuitry 44.

Those skilled in the art will recognize that the individual transmit and receive waveguides for the monostatic system shown may be implemented (identified in FIG. 2 using reference numeral 52) using an optical circulator, an optical coupler, or using independent waveguides, among other approaches. There are myriad active or passive methods for implementing the scanning system for a coherent LiDAR system, and such methods can all be used with this invention. The scanning system 56 may comprise, e.g., an optical phased array, a scanning mirror, or any suitable means for laser beam steering.

With continued reference to FIG. 2, light is emitted from the programmable laser 12 into a beam splitter 46. A portion of the light passes through the beam splitter 46 and reaches an optional amplifier 48. The light then reaches the scanning system 56 and is directed through the transmission aperture 18 to an object 20. A portion of the light is reflected by the object 20 and is received by the receiving aperture 22. The received light is then directed by the scanning system 56 towards the coherent detector 26. The coherent detector combines the received light with a portion of the light from the programmable laser 12, using one of the many known variations of coherent balanced detection. Balanced detection may be used to improve sensitivity of the system and to allow common-mode rejection of light returning from previous sweeps. A signal from the coherent detector 26 is received by a LiDAR processor 30. The system 10 may also include an amplifier 48, beam splitter 46, a coupler 60, and any other necessary elements as would be understood by one of ordinary skill in the art.

The light source 12 may comprise a monolithically-constructed semiconductor laser or non-semiconductor monolithic laser in general. Monolithically-constructed semiconductor lasers or non-semiconductor monolithic lasers in general are a class of single-mode laser for producing swept wavelengths appropriate for Digital Coherent LiDAR, and can further be designed to enable high-speed wavelength tuning. Monolithic semiconductor lasers include several sections or segments in the semiconductor, which serve, for example, as adjustable cavity mirrors, laser gain, coupled cavities, cavity phase and (optionally) external amplification. Examples are fast-tuning DFB or DBR lasers, Vertical Cavity Surface Emitting Lasers (VCSELs), VCSELs with Micro-electromechanical systems (MEMS) tuning structures, Vernier-tuned Distributed Bragg Reflector (VT-DBR) lasers, Vernier-tuned ring lasers, Y-branch lasers, coupled cavity lasers, discrete mode lasers, injection-locked or externally-stabilized lasers, Super-Structure Grating Distributed Bragg Reflector (SSGDBR) lasers and similar devices. Because these lasers are typically monolithic with no moving parts (excepting the MEMs devices), their cavities and associated optics are extremely stable and can operate in single-longitudinal mode with narrow linewidth and long coherence length. Tunable monolithic lasers of this class may utilize multiple control signals to tune the wavelength, presenting a challenge to creating wavelength sweeps without wavelength discontinuities. In such lasers, a key enabler of control and programmability may be recent inventions enabling precise control of laser wavelength and power tuning profiles versus time with high SMSR and multivariate control spaces such as U.S. Pat. Nos. 9,455,549 and 9,595,804.

Figure 3:
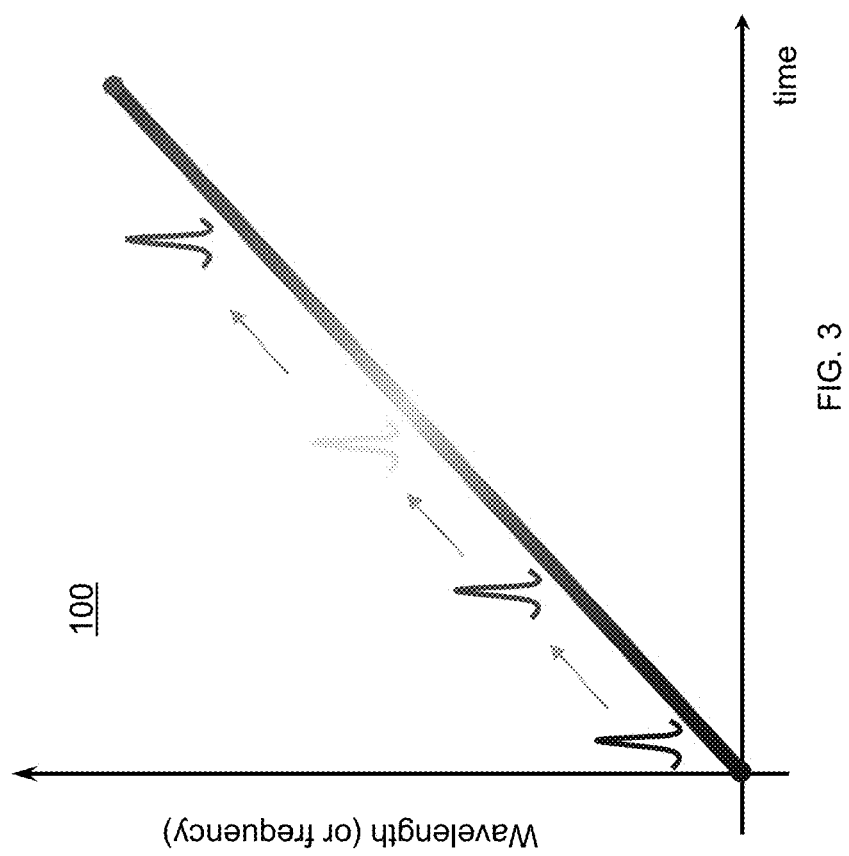
FIG. 3 is a plot showing an exemplary waveform comprising a linear wavelength sweep.

FIG. 3 shows a standard 'linear sweep' (also referred to as a 'linear chirp' or 'linear frequency modulation'). By itself, this waveform 100 has historically been difficult to generate accurately, quickly, and cost effectively. Only recently has this optical waveform become routine in certain application areas, and its linear quality is often still the fundamental limit to system performance. Typically, passive control is used, or one or more closed loop control systems are used, to generate a waveform having necessary properties. But, because such current systems operate on thermal time scales, they are limited to operating on the millisecond or microsecond time scale (i.e., larger than 1 microsecond) and are specifically designed and optimized for only this linear sweep. Such current systems cannot be modified to produce arbitrary waveforms for digital coherent LiDAR operating at time scales less than one microsecond.

Figure 4:
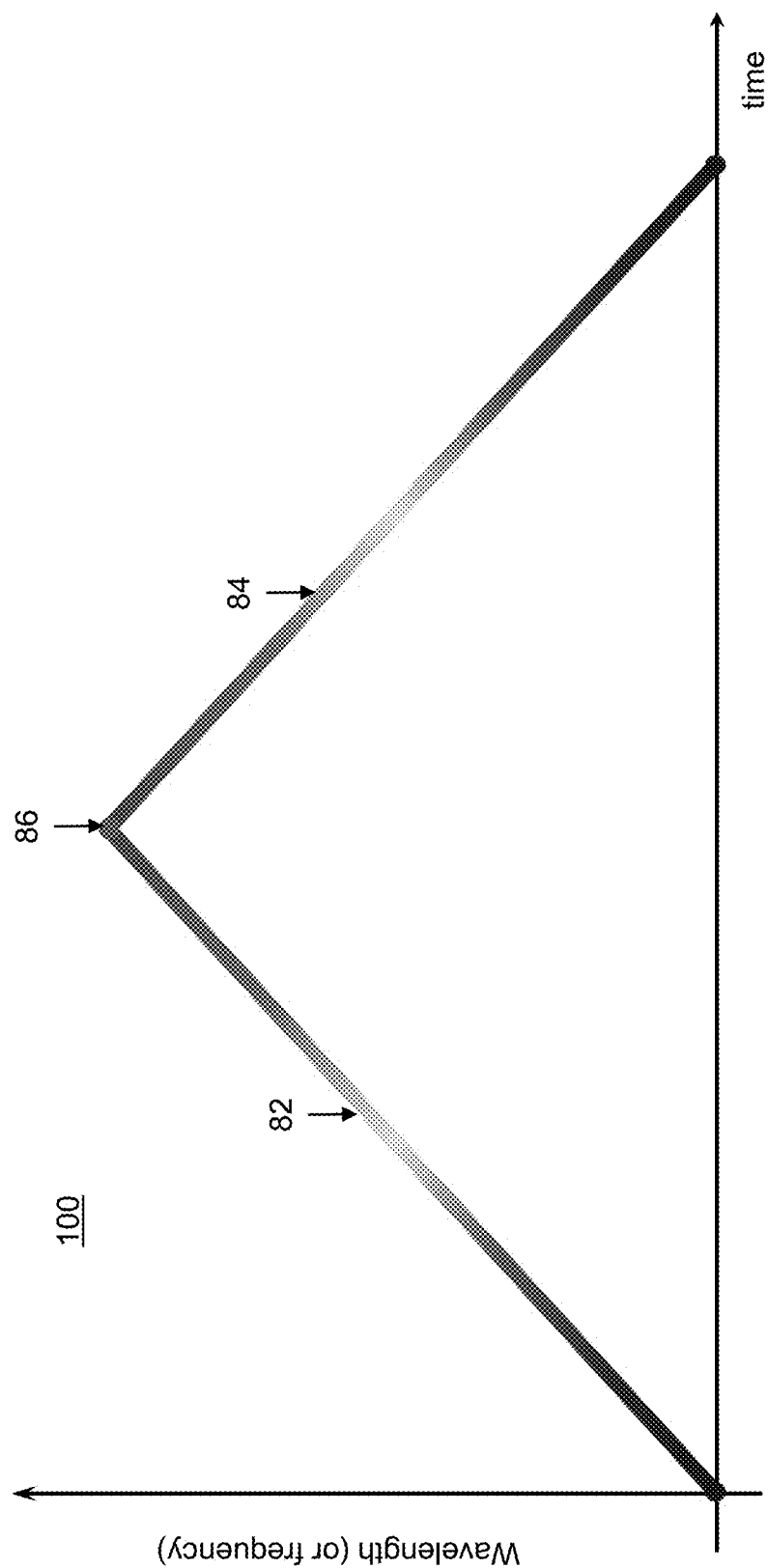
FIGS. 4 and 5 are plots showing alternative exemplary waveforms including portions having different slopes.

FIG. 4 shows the next most common (compared to FIG. 3) waveform 100 for coherent LiDAR. FIG. 4 simply adds a reversed linear chirp 84 to the linear chirp 82 of FIG. 3. Two nearly equal and opposite linear slopes are used for the linear chirp 82 and reversed linear chirp 84 to enable extraction of parameters such as velocity from the resulting data. This allows Doppler information, or velocity information, to be extracted from the LiDAR signal processing.

Current lasers suffer numerous challenges when attempting to generate this waveform 80, such as a significant time delay at the turn-around point 86. For example, as the mechanical elements of the laser slow down, reverse direction, and then accelerate again for the 'down chirp' 84. As with the standard linear chirp 82, additional complex, expensive electro-optic hardware (non-mechanical) is usually required to properly execute this waveform, making this approach difficult or unfeasible for many applications.

Figure 5:
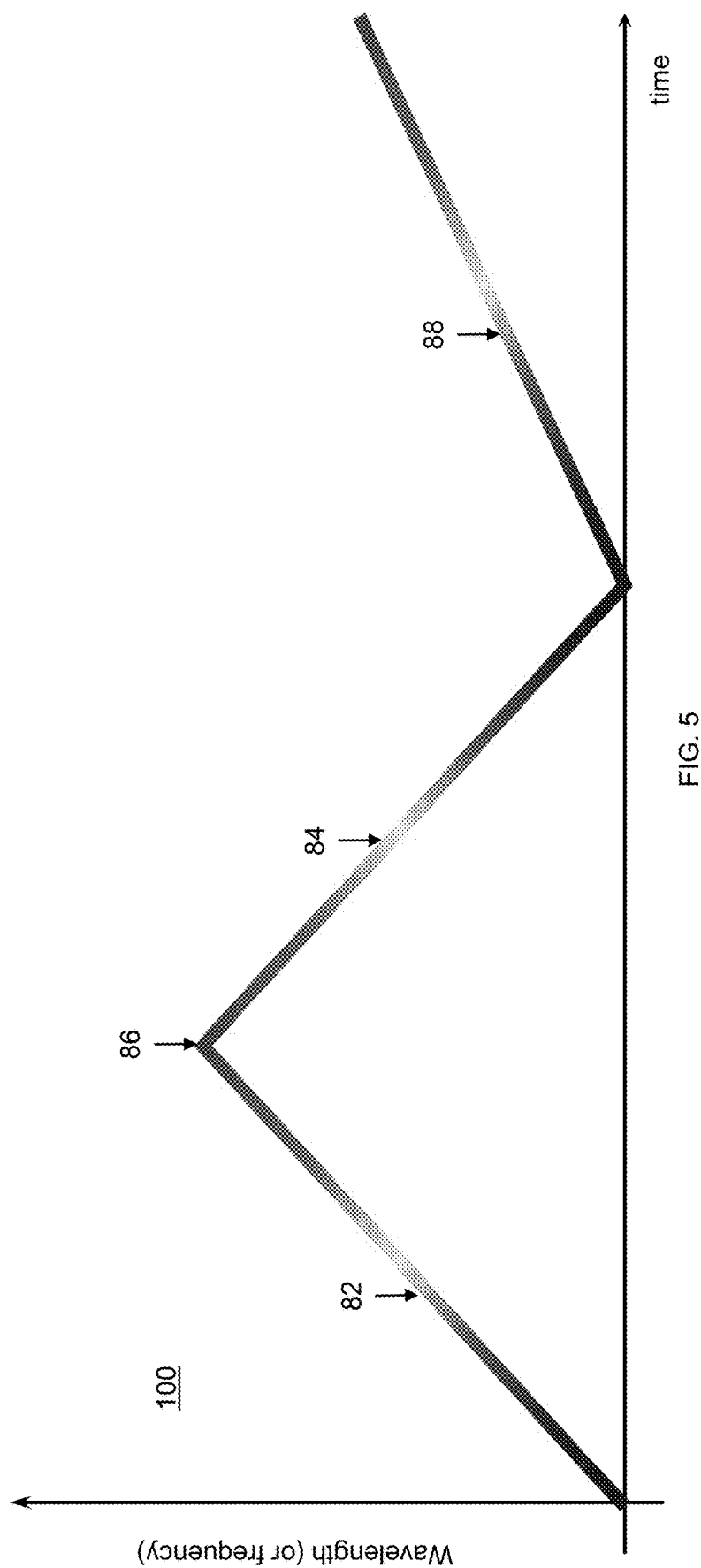

FIG. 5 shows an example of another waveform 100 used for coherent LiDAR. Here, a third linear sweep segment 88 is added with a different slope than the first two sweep segments 82, 84. This waveform may be used for multiple target discrimination and distinguishing 'ghost' targets from real targets.

As described above, the DCLAW system 10 includes a laser source 42 configured to output electromagnetic radiation based on an input signal. The circuitry 44 is configured to supply the input signal to the laser source 42 to control electromagnetic radiation output by the laser source 42, such that the laser source outputs a waveform 100 including a plurality (discrete set) of output states 102. The laser source 42 outputs electromagnetic radiation having a particular wavelength during the output states 102. Each of the plurality of output states 102 is separated in time from neighboring output states of the plurality of output states 102 by a time span. The particular wavelength of the electromagnetic radiation for a first output state of the plurality of output states may be different from the particular wavelength of electromagnetic radiation for a second output state of the plurality of output states. At least two of the plurality of output states of the waveform 100 may be separated by a particular time span of less than 1 microsecond. Each output state 102 may have a particular wavelength, power, and coherence.

Figure 6:
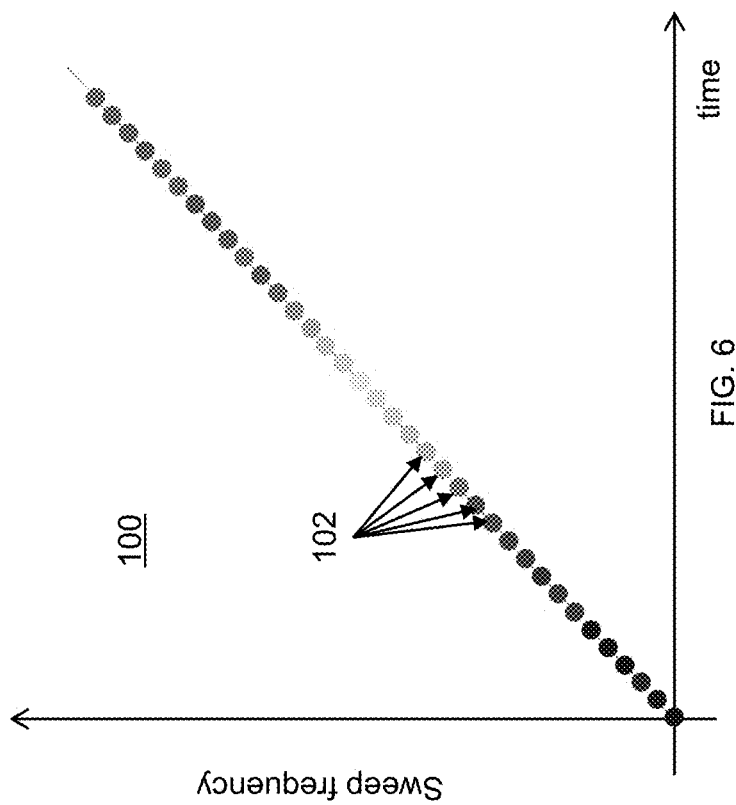
FIG. 6 is a plot showing a waveform having a plurality of output states.

FIG. 6 shows a digital version of an analog linear frequency sweep 100 (also referred to as a waveform). The sweep 100 is broken into a series of digitally-controlled output states (also referred to as frequency steps or output points) 102 via a digitally-controlled trigger sequence in time. The frequency steps 102 are evenly spaced in FIG. 6. Such a digital sweep 100 in frequency has deep ramifications for the overall coherent LiDAR detection process, and novel aspects of the instantaneous sweep frequency as well as the digital sampling process for the coherent detection must be considered. A duration of each output state may be in the range from 0.1 nanosecond to 1 microsecond.

There are two major features inherent to high speed Digital Coherent LiDAR that should be understood and controlled: (1) the instantaneous laser frequency in the time between digital frequency steps, and (2) the digital sampling that occurs during the coherent detection process for the LiDAR return signal. As an example of these issues, FIGS. 7 and 8 detail the situation that occurs for deviations from sweep linearity in standard coherent LiDAR, but for a digital sweep.

During the time span separating each of the plurality of states 102 in the waveform 100, the laser source 42 may or may not emit electromagnetic radiation. That is, the amplitude of light emitted by the laser source 42 may be reduced to at least 10-100 times less than the amplitude of light emitted during the output states 102. For example, the amplitude of electromagnetic radiation (also referred to as light) in between the output states 102 may be at least 10 dB less than an amplitude of the electromagnetic radiation emitted during the output states. Or, the amplitude of the light between output points may be held constant. Or, the amplitude of the light between output points may be shaped in some fashion.

Figure 7:
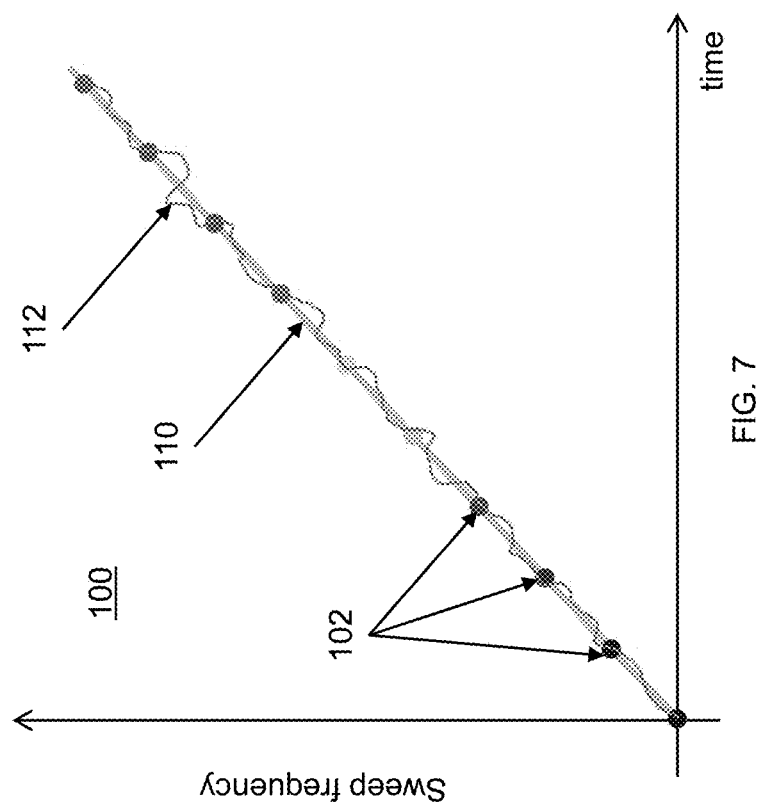
FIG. 7 is a plot showing instantaneous output wavelength of electromagnetic radiation in between the output states.

FIG. 7 shows a digital linear frequency sweep 100, but using widely spaced frequency steps 102 so that the instantaneous frequency between steps is more clearly visible. The frequency steps 102 (shown as circles) are points in time where wavelength steps for the laser (digital commands) occur. This shows a digital linear frequency sweep, using widely spaced intervals between frequency steps, for clarity. A perfect linear transition 110 (shown as a straight line) between steps is shown, as well as an imperfect, fluctuating transition 112 between steps (shown as a wandering path).

Figure 8:
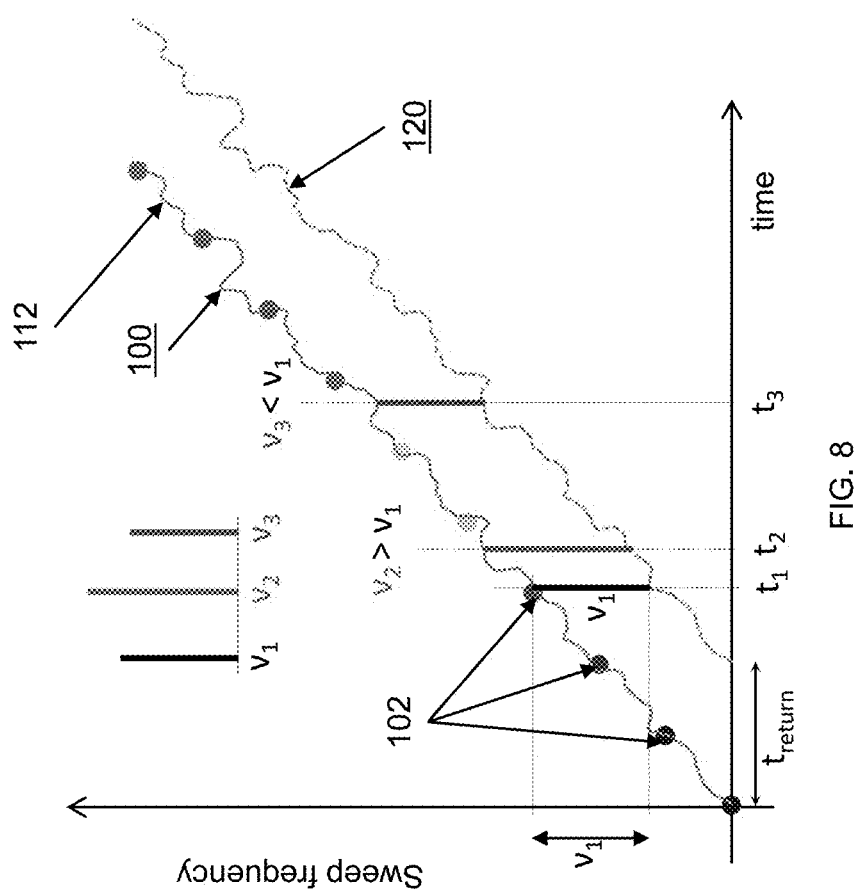
FIG. 8 is a plot showing instantaneous output wavelength of electromagnetic radiation in between the output states, as well as an exemplary corresponding LiDAR return signal delayed in time.
Figure 16:
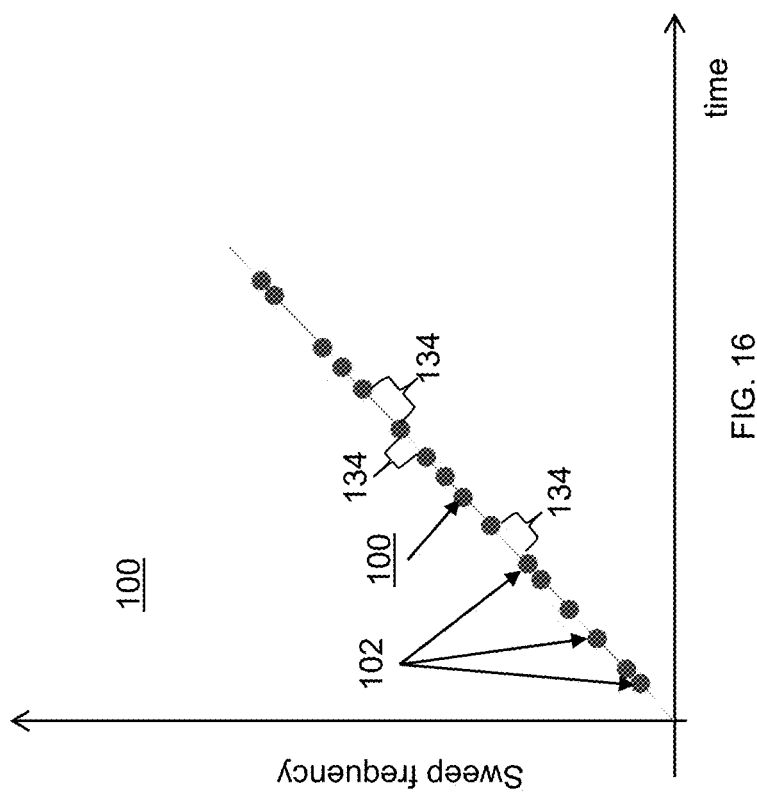
FIG. 16 shows another exemplary waveform where the output states are separated by different time spans.

FIG. 8 shows a sweep 100 having a somewhat wandering transition 112 between frequency steps 102. A corresponding LiDAR return signal 120 is also shown. The return signal is delayed in time by $t_{return}$, but is otherwise a replica of the outgoing sweep 100, as is well-known by those skilled in the art. If the sweep transition 112 fluctuates between frequency steps as shown, then the resulting LiDAR return signal 120 is degraded. As demonstrated by the waveform 100 shown in FIG. 8, a same time span may separate each of the neighboring output states 102 of the plurality of output states 102. Alternatively, as shown in FIG. 16, the time separating output states 102 in the waveform 100 may vary. That is, a first time span separating a first two output states of the plurality of output states may be different from a second time span separating a second two output states of the plurality of output states.

The coherent detection system 26 detects this return signal as a beat frequency between the outgoing sweep 100 and the return sweep 120, and at time $t_1$ the frequency is $v_1$. But at another time, $t_2$, the detected frequency is $v_2 \neq v_1$, as shown. Further, at another time, $t_3$, the detected frequency is $v_3 \neq v_1$, as shown. In the ideal linear case, $v_1 = v_2 = v_3$, but here that is not the case due to the fluctuating frequency sweep signal 112, and specifically the deviations from linearity in between digital steps. The difference frequencies ($v_i$) between the outgoing sweep 100 and return signal 120 are shown by vertical bars at points in time where sampling of the return signal 120 occurs.

Figure 10:
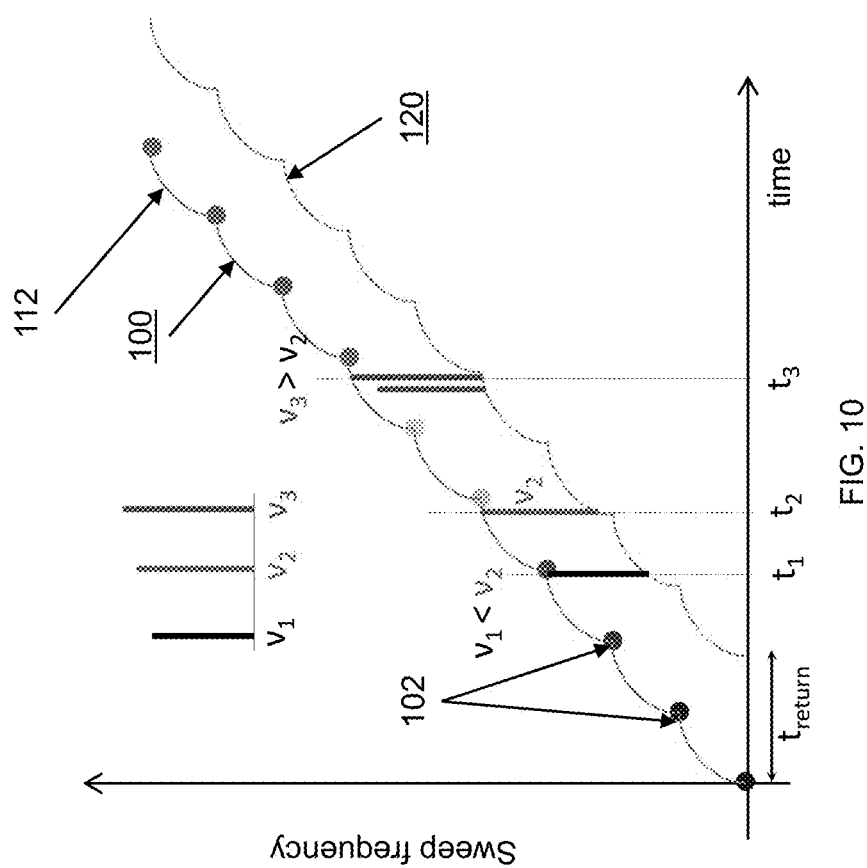
FIG. 10 is a plot showing the emitted waveform of FIG. 9 and a corresponding return waveform.
Figure 9:
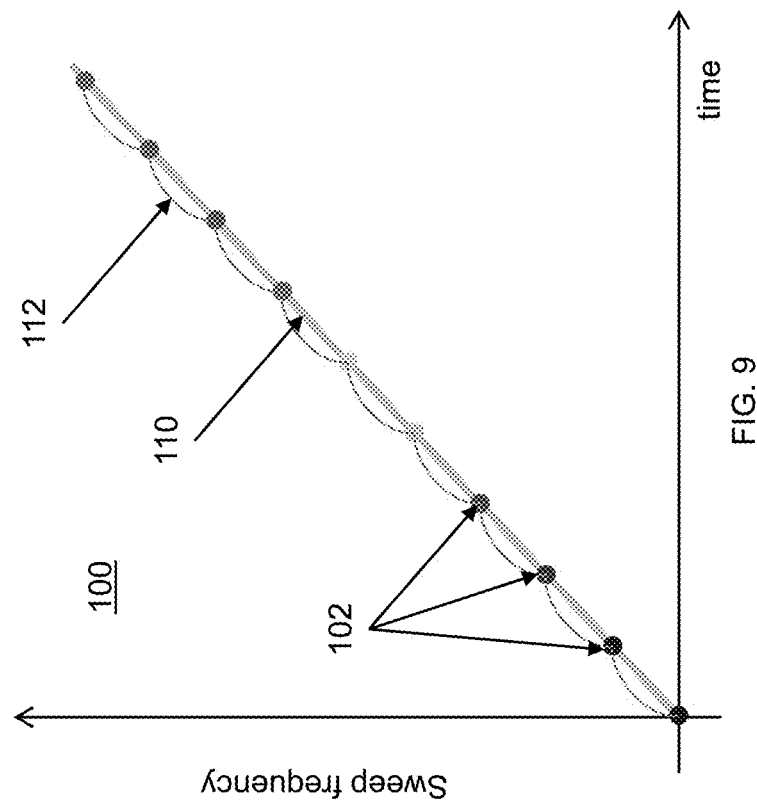
FIG. 9 is a plot showing another exemplary emitted waveform.

For digital coherent LiDAR, these are new aspects to consider beyond the usual nonlinearity considerations described in FIG. 8. FIGS. 9 and 10 show a more realistic scenario for a digital frequency sweep using a high-speed digitally-controlled laser. In these figures, the instantaneous laser frequency between digital steps does not fluctuate randomly, but rather has a repeatable, consistent deviation from linearity, as shown.

FIG. 9 shows a digital linear wavelength (frequency) sweep 100, using widely spaced intervals between wavelength (frequency) steps 102, for clarity. A perfect linear transition 110 between steps is shown, as well as a consistent nonlinear instantaneous wavelength between steps 112.

FIG. 10 shows the outgoing sweep 100 of FIG. 9 and its corresponding return sweep 120. As described above regarding FIG. 8, the small deviations from linearity between the frequency steps 102 leads to a degradation of the LiDAR signal ($v1 \neq v2 \neq v3$), depending on the exact points in time that sampling for the coherent detection occurs. That is, even with a consistent pattern between steps in FIGS. 9 and 10, the resulting LiDAR signal can be degraded, depending on sampling conditions (e.g., caused by uneven sampling).

Figure 11:
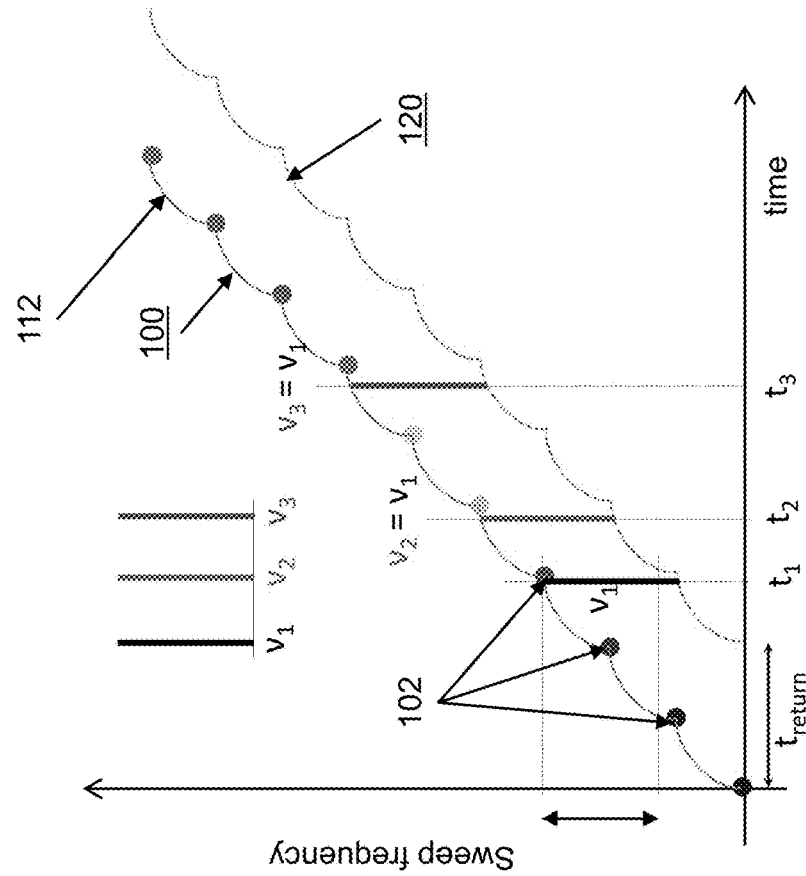

FIG. 11 shows a special case where the LiDAR signal is not degraded. In this example, the return signal 120 is delayed by an integer multiple of the frequency step interval. However, this situation occurs so seldom that it is not a feasible general solution for elimination of this potential problem from Digital Coherent LiDAR.

Figure 12:
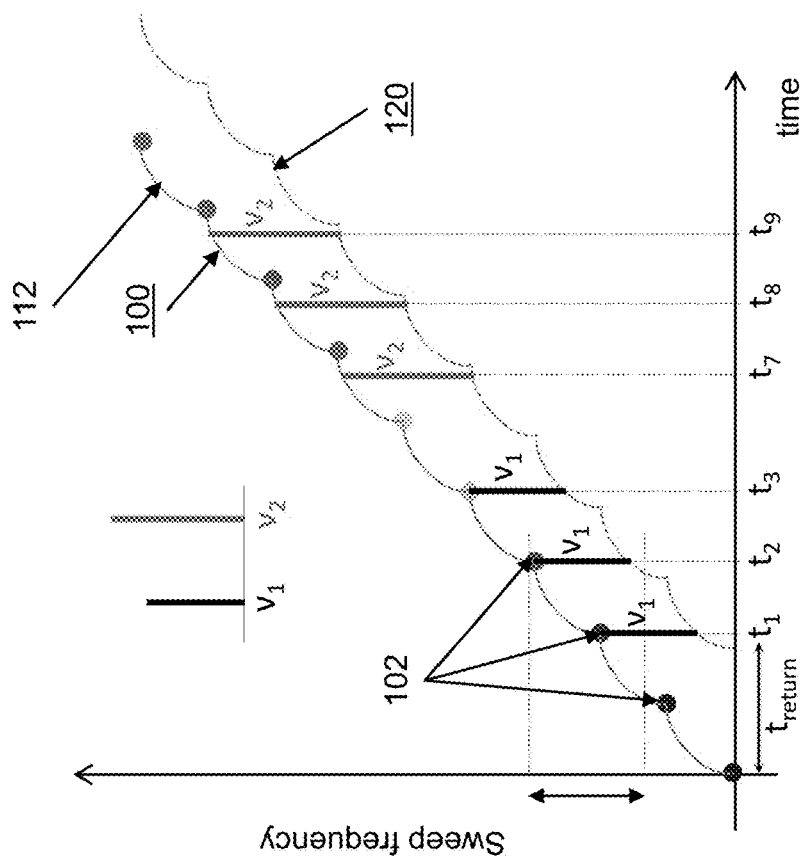
FIGS. 11 and 12 show alternative embodiments of emitted and returning waveforms, with different time sampling embodiments.

FIG. 12 shows a more general solution to this situation, involving synchronization between the digital frequency steps comprising the frequency sweep and the digital sampling of the LiDAR return signal. FIG. 12 shows two examples where consistent, repeatable deviations from linearity between frequency steps are effectively compensated, or cancelled. Example 1 shows sampling at times t1, t2, and t3—synchronized so that sampling occurs at the exact locations of the frequency steps—leading to detected beat frequency $v_1$ in all cases. Example 2 shows sampling at times t7, t8, and t9—synchronized somewhere between the exact locations of the frequency steps—leading to beat frequency $v_2$ in all cases. While it is the case that $v_1 \neq v_2$, if digital sampling is consistent throughout, then this error is easily managed and does not impact the overall LiDAR signal. Various forms of synchronous over-sampling or under-sampling also allow this error to be effectively managed. Hence this form of tightly synchronized sampling between digital frequency steps and digital sampling with coherent detection is a valid means to implement digital coherent LiDAR and is an aspect of this invention. It is noted that this implementation may require a very high speed wavelength tunable laser, as the detection sampling rate required for many forms of coherent LiDAR is typically measured in gigasamples per second, thus requiring that the frequency steps also occur on this time scale (approximately nanoseconds to microseconds, e.g., less than 1 microsecond).

However, the above two examples described concerning FIG. 12 may still suffer an uncertainty for closely spaced targets or moving targets, as small changes in $t_{return}$ can lead to meaningful changes in measured v, creating effective uncertainty in range. Equivalently, a slight shift of the time delay (a moving target) relative to the wavelength step pattern (t7, t8, t9) results in a shift in measured v, even though the sampling was synchronous.

Figure 13:
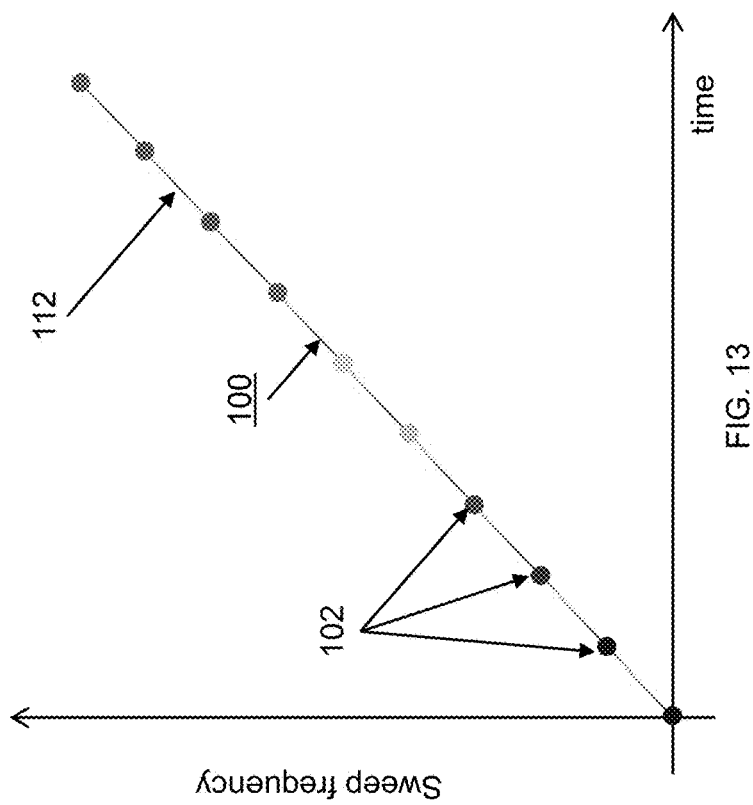
FIG. 13 is a plot showing another exemplary emitted waveform.

Another aspect of this invention is to eliminate deviation from linearity between frequency steps in a digital sweep, thereby effectively 'masking' the digital nature of the sweep. FIG. 13 depicts a digital sweep 100 that is linear between frequency steps 102. By tailoring the high-speed inputs to the programmable laser source to account for electrical and optical time responses, the instantaneous frequency between steps 112 can be shaped and managed. For example, the shaping could take the form of a linear transition of the instantaneous frequency between steps, which may be generally preferable for digital coherent LiDAR.

Figure 14:
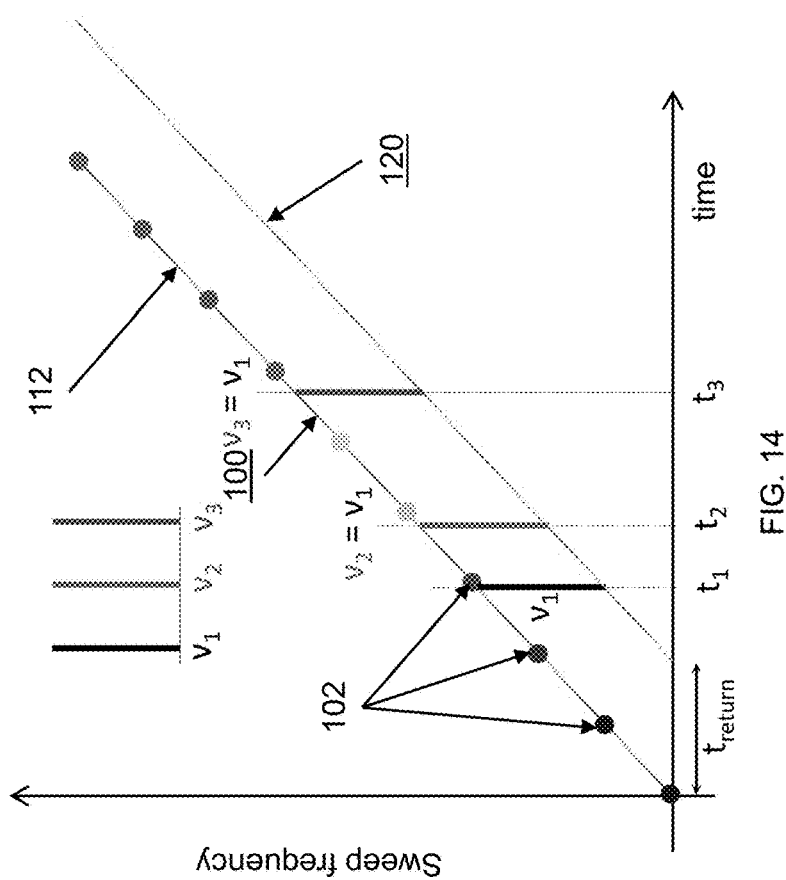
FIG. 14 is a plot showing the emitted waveform of FIG. 13 and a corresponding return waveform.

FIG. 14 shows the resulting LiDAR scenario for the digital sweep 100 shown in FIG. 13. As shown, the precision of the resulting LiDAR signal is not degraded (v1=v2=v3), regardless of sampling times. For instance, the sampling could be random, asynchronous, or synchronous. In particular embodiments, this is an important aspect as we consider more complex, or even arbitrary, waveforms compared to the standard LiDAR linear sweeps.

Figure 15:
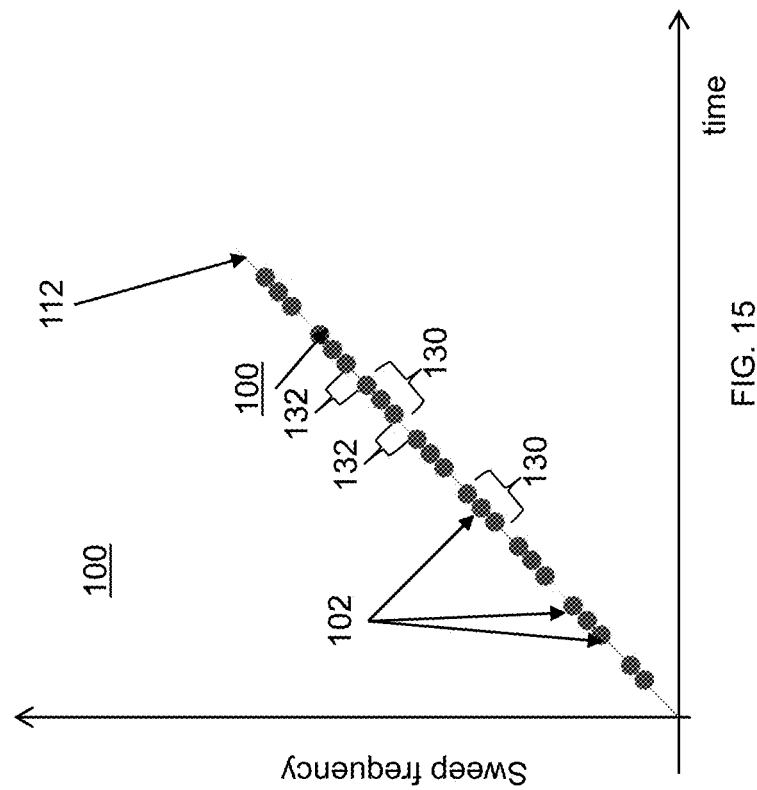
FIG. 15 shows another exemplary waveform including groupings of output states.

FIGS. 15 and 16 show aspects of the invention applied to digital linear sweeps with uneven frequency steps. FIG. 15 shows a sweep 100 having digital frequency steps that occur in bursts 130, separated by gaps in time 132, rather than the even frequency spacing of FIG. 13. That is, the plurality of output states 102 may be grouped into a plurality of output groups 130. Each of the plurality of output states 102 may be a member of an output group 130. Each member of each output group 130 may be separated from neighboring members of the output group by an intragroup time span. Each output group of the plurality of output groups may be separated from neighboring output groups of the plurality of output groups by an extragroup time span. The extragroup time span may be longer than the intragroup time span. As will be understood by one of ordinary skill in the art, the laser source 12 may or may not output electromagnetic radiation during the gaps in time 132 (also referred to as digital frequency steps 134).

As described above, FIG. 16 shows yet another scenario where the digital frequency steps 134 occur at random intervals in time, rather than evenly spaced intervals in time.

An advantage of waveforms 100 shown in FIGS. 15 and 16 is that the waveform 100 can reduce artifacts (e.g., due to aliasing), range ambiguity, or velocity ambiguity from targets by purposefully and in a controlled manner breaking the periodicity of the incrementing (and hence sampling) of the optical frequencies incremented by the light source. That is, by altering the time span 134 between the output points 102, the resulting waveform 100 may result in improved performance of the DCLAW system 10.

FIGS. 15 and 16 also illustrate that, through programmability and digital control of the amplitude for the laser source 12, it is possible to add amplitude control and modulation to enhance the encoding and immunity from spoofing, and also enhance signal-to-noise ratio. As illustrated in FIGS. 15 and 16, one embodiment of the present invention is to digitally turn-off the amplitude of light between the digital steps of the wavelength of the light source 12, whether those steps are equal in optical frequency or unequal (being random step sizes or a pattern of step sizes). Further aspects of the present invention utilize amplitude control to adjust the light amplitude at potentially each step. Through this control it is possible to create a power vs. optical frequency profile that is precisely Gaussian, or more generally, precisely apodized to represent the shape of a desired time-domain window (e.g., tapered Cosine, Kaiser, Blackmann-Harris, Hann, Hamming, etc.) that may suppress sidelobes in subsequent signal processing operations such as a Fast Fourier Transform. Prescribing the power profile in the light source reduces the signal processing requirements from the hardware and may reduce latency of the LIDAR data when rendering an image composed of 100,000's of sweeps and processing steps.

Waveforms may also be generated including digital frequency hops, digital frequency steps, and nonlinear patterns. Frequency stepping refers to a sharp transition (short time interval, approximately one microsecond or less) between two substantially similar frequencies. An important aspect of a frequency step is that between the neighboring output states representing a step, which have substantially similar frequencies, the laser must tune continuously and monotonically. This is important because the instantaneous laser wavelength between frequency steps is used during the reconstruction (detection) of an individual coherent LiDAR signal during a detection period. This is to be distinguished from the instantaneous laser wavelength between frequency hops, which is not necessarily used during detection of the coherent LiDAR signal. Frequency hops generally separate different individual LiDAR signals (different coherent detection periods) while a pattern of frequency steps represents the actual detection period.

That is, a frequency step comprises a change in frequency of at least a frequency step threshold between two neighboring output states. A sequential pattern of such frequency steps may be considered a frequency sweep, associated with a coherent detection period or sweep time, and such a sweep contains a range of frequencies known as the sweep bandwidth. Frequency hopping refers to a sharp transition (short time interval, approximately one microsecond or less) between two substantially different frequencies. That is, a frequency hop comprises a change in frequency of at least a frequency hop threshold between two neighboring output states. The frequency hop threshold may be at least five times as large as the frequency step threshold.

For example, a frequency hop may involve a transition between two frequencies that differ by approximately the bandwidth contained in a frequency sweep, or more, and therefore involves frequency differences substantially larger than those used for frequency stepping. As further example, if a frequency step corresponds to a difference of 10 MHz, then a frequency hop would generally correspond to a difference of 100 MHz, or larger. If the step is 100 MHz, then the hop would generally be 1 GHz, or larger. That is, a frequency hop may comprise a change in frequency between two output states that is at least 10 times as large as the change in frequency between two output states that are part of a frequency step.

If there is no change in frequency between two output states, then these two output states represent a frequency dwell. When compared to a frequency dwell, a frequency hop or frequency step represent a difference in frequency larger than a dwell frequency difference (i.e., a zero frequency difference). These exemplary 'combination' waveforms enable features such as encryption and encoding, both aspects of digital signal processing that have not previously been available to LiDAR.

FIGS. 17 and 20 show a waveform 100 including both frequency hops 142 and frequency steps 140. The frequency hop includes a transition between two substantially different frequencies for time-adjacent output states within the plurality of output states. The time span separating adjacent output states may be less than 1 microsecond.

The waveform 100 may further include frequency steps 140 located between one or more frequency hops. The frequency steps 140 may comprise a series of adjacent output states of the plurality of output states 102, which are substantially similar in frequency. A first output state of a frequency stepping pattern may comprise the second output state of a first frequency hop. A last output state of the frequency stepping may comprise the first output state of a second frequency hop. Frequencies of the series of output states of the frequency stepping may have a prescribed profile. The prescribed profile may be constant or linear in time.

The waveform 100 may therefore comprise a series of frequency hops 142 separated by frequency steps 140. A wavelength separation between a last output state of a pattern of frequency steps and a first output state of a following pattern of frequency steps may be greater than a wavelength separation between adjacent output states within each pattern of frequency steps (this larger separation in wavelength is the hop). As is described in further detail below, the pattern of frequency steps and hops may be determined based on a patterned code that is unique to the system.

A specific example is shown in FIG. 17. In FIG. 17 a digital frequency sweep (also referred to as a pattern of frequency steps) 140 occurs until time t1, followed by a digital frequency hop 142 and a subsequent digital frequency sweep until time t2. This process repeats at times t2, and t3. The time span between output points may be less than 10 microseconds. Such short time scales are not possible with simple analog control or even closed-loop analog control over the laser's frequency. This particular waveform also solves the classic analog coherent LiDAR issue where two adjacent sweeps in time lead to confusing signals, ambiguities, and aliasing, shown in FIG. 18.

Figure 18:
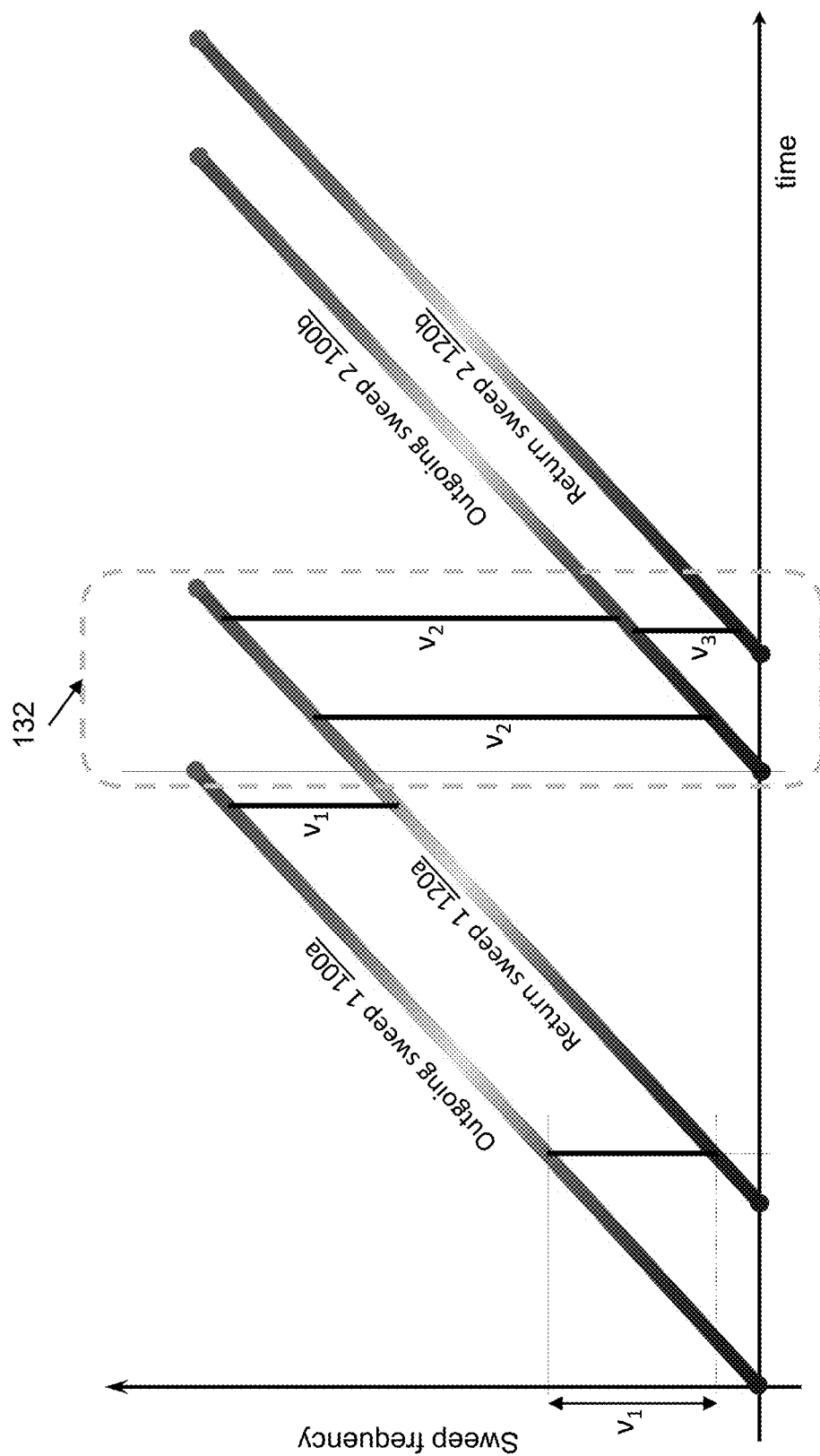
FIGS. 18 and 19 each show waveforms including two frequency sweeps, as well as the ambiguous region of waveform overlap in between sweeps.

In FIG. 18, because the second linear frequency sweep 100b (outgoing sweep 2) occurs at the same optical carrier frequency as the first sweep 100a (outgoing sweep 1), there is an interim period 132 where the return sweep from a target 120a (return sweep 1, from outgoing sweep 1) mixes with the new second linear sweep 100b (outgoing sweep 2). This creates an incorrect frequency in the system (shown as v2, instead of v1) and a corresponding false target. Further, in this same time an actual new target from sweep 2 may occur, adding further confusion to the interpretation. This issue may be avoided by adding a sufficient time delay between the end of outgoing sweep1 100a and the beginning of outgoing sweep2 100b, but this additional time delay may be unacceptable for certain applications.

Figure 19:
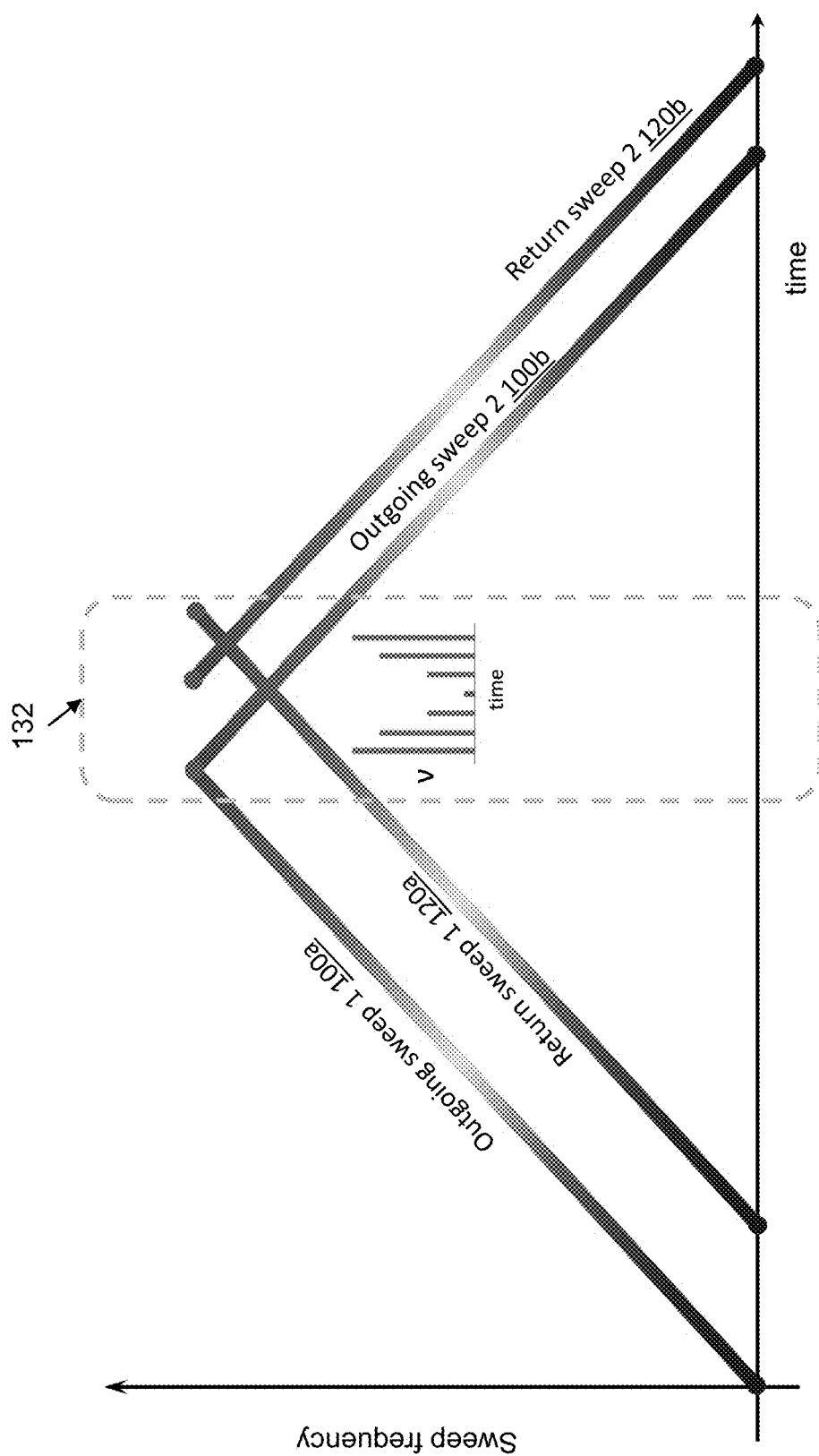

Another similar example to FIG. 18 is shown in FIG. 19. In FIG. 0.19, the second outgoing sweep 100b is a down-chirped copy of the first outgoing sweep 100a. In this example, the confusing signals result in a rapid frequency chirp in the coherent detection process, rather than discrete interfering frequencies.

The problems described above and demonstrated in FIGS. 18 and 19 (i.e., interfering frequencies and ambiguities in the LiDAR interpretation) may be removed by hopping the optical carrier frequency by a large enough amount that the interference (detection frequency) between the return sweep1 120a and outgoing sweep 2 100b is larger than the bandwidth of the coherent detection system. FIG. 17 and FIG. 20. both show examples of this solution, utilizing frequency hops.

FIG. 20 shows a digital waveform 100 similar to that shown in FIG. 17, except there are only up-chirped frequency segments. Further encryption of this waveform 100 is possible by choosing the pattern of frequency hops to be random rather than a consistent pattern. In FIG. 20 the pattern in time could be 140a→140b→140c→140d, as shown. Or, it could instead be 140c→140a→140d→140b, or 140b→140d→140c→140a. This randomness enables encryption on a per-LiDAR basis, as might be used for autonomous cars. For example, each car may have its own static code based on the random pattern of frequency hops associated with this waveform, making it extremely unlikely that one car's LiDAR interferes with another car's LiDAR. Or, the pattern of frequency hops (codes) could be changing in time for an individual device (such as a vehicle). These individual chirps (single pattern of frequency steps) may represent individual LiDAR measurements, or they can be bundled into an N-chirp sequence enabling phase and velocity information to be obtained, as is well known in radar. Further, this adds an additional layer of security making it extremely difficult, if not impossible, for an adversarial attack into the car's LiDAR system. An attacker would have to know the random pattern of frequency hops a priori.

Figure 21A:
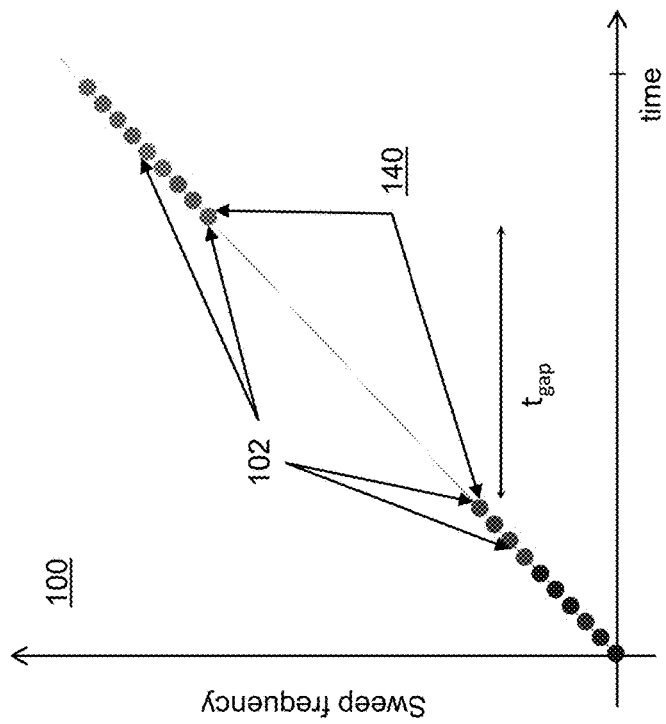
FIG. 21A shows a waveform having a sweep duration and a time interval located between frequency steps.

Additional examples of uniquely digital waveforms that can be used with digital coherent LiDAR include variations of the above. For instance, FIG. 21A shows a series of digital linear sweeps separated by a time interval and a frequency hop. In this example, a frequency stepping pattern occurs for time $t_{sweep}$, then a delay time of $t_{interval}$ occurs, then another frequency stepping pattern begins after a wavelength hop. This sequence can be repeated in a variety of ways to form the larger waveform 100.

The waveform 100 shown in FIG. 21A may be used to reduce the coherence requirements for the sweeping source, while keeping the advantages of a total bandwidth much larger than the individual sweep bandwidths. FIG. 22 is a specific case with a larger time interval $t_{gap}$, and where the individual sweeps are otherwise segments of a larger contiguous sweep.

Figure 21B:
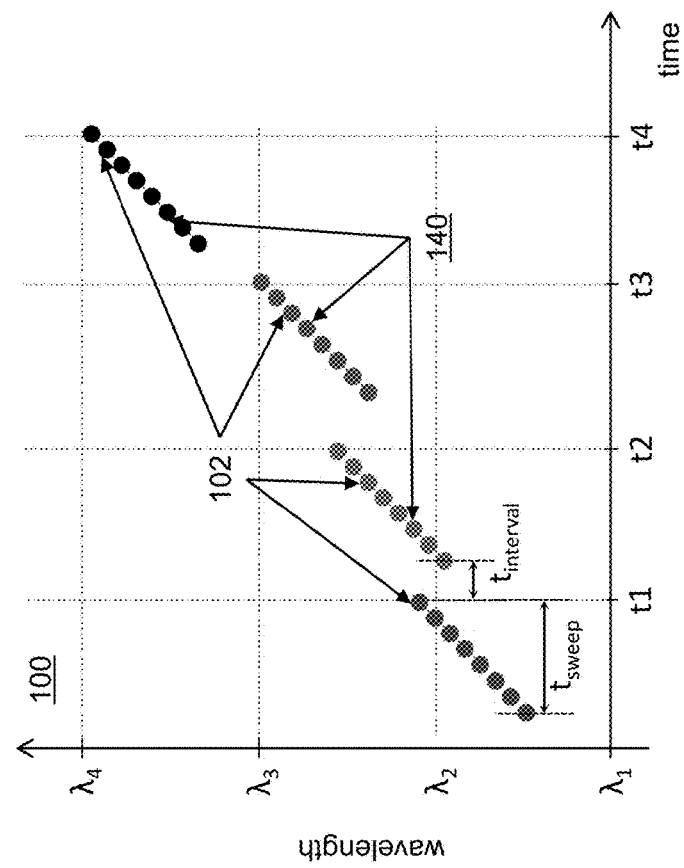
FIG. 21B shows one potential shaped amplitude of the waveform for FIG. 21A.

Turning to FIG. 21B, the amplitude of the electromagnetic radiation being emitted by the laser source 12 may be modulated. For example, each output state of the plurality of output states 102 may have an equal amplitude. Alternatively, each output state of the plurality of output states may have an amplitude and at least two output states of the plurality of output states may have a different amplitude. For example, the amplitude of each output state of the plurality of output states are configured such that a power vs. time profile of the waveform has a desired profile. The desired profile may be a Gaussian, raised cosine, and/or any other known windowing function used for digital signal processing. For example, the desired profile may create a windowing function over the time-domain waveform that expedites signal processing and enhances sensitivity to achieve the range or velocity to a target.

As described above, the waveform 100 may comprise a series of frequency hops 142 separated by frequency steps 140. The output states for the individual frequency stepping patterns may each have a specified amplitude vs time profile.

In the upper graph of FIG. 21B, the amplitude of light for each frequency step has a shaped profile. In the lower graph of FIG. 21B, the amplitude (i.e., the intensity) of the electromagnetic radiation is constant during each frequency stepping pattern (also referred to as a sweep, or pulse) and the laser source 12 is turned-off during $t_{interval}$.

Figure 22A:
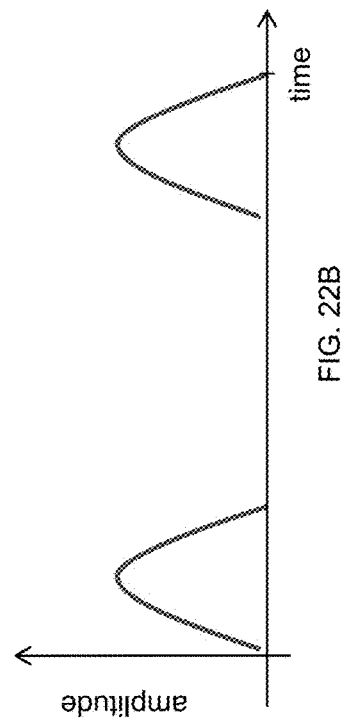
FIG. 22A shows an exemplary waveform having a gap in time between segments or groups.

In FIG. 22A, a modified linear wavelength (frequency) sweep is shown having a substantial time gap ($t_{gap}$) between two sections of an overall linear sweep. FIG. 22 shows that the amplitude vs. time of the waveform 100 shown in FIG. 22A may be further controlled to form an apodized profile during each sweep segment.

FIG. 23 is a further variation of the waveform 100 that time multiplexes two stepped, chirped digital sweeps 100a, 100b by effectively placing the digital steps of the second sweep in the time gaps of the first sweep.

Figure 22B:
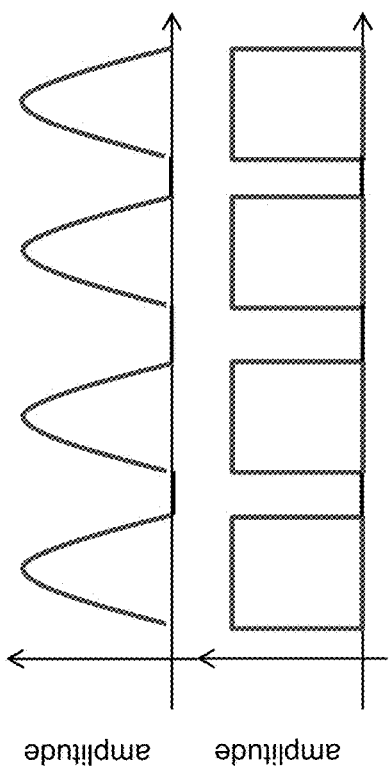
FIG. 22B shows an amplitude of the waveform for FIG. 22A.

FIGS. 21-23 illustrate embodiments of the present invention where the source may be programmed to vary the light amplitude vs. time profile in manners that enhance encoding, discrimination from other LIDARs, and signal-to-noise ratio. In one aspect of the present invention, in FIG. 21 each sweep segment 140 (e.g. t0 to t1, or t1 to t2, t2 to t3, and so on) the amplitude of the source may be varied to produce power profile vs. time that are time-domain windows for the data from these sweep segments that suppresses sidelobes in subsequent FFTs. In FIG. 21A, amplitude modulation and control within the sweep of the optical wavelength or frequency may be supplemented by extinguishing the light between sweep segments as shown by the $t_{interval}$ between the end of one sweep pulse and the start of the next sweep pulse. The same aspect of the present invention may be applied in FIG. 22B, where between the two sweep segments the light from the source may be extinguished. During the sweep pulse segments 140, the amplitude vs time profile may be shaped as independent time-domain windows, or the profile may be shaped as a time-domain profile that is shaped as if the laser did sweep the gap, showing the taper of the profile rising in the first sweep pulse, and subsequently decreasing in the second sweep pulse as though the sweep and its amplitude actually occurred in the gap. This shape may enhance the signal to noise of the resulting signal processing (FFT) over the data from both sweep pulses.

FIG. 24 shows how a properly timed high-speed digital sweep can be used in the field of spectroscopy to eliminate the time spent sweeping over an uninteresting portion of an overall spectral pattern. This is enabled by digital frequency sweeps combined with digital frequency hops. By eliminating uninteresting portions of the spectrum, the sweep can be executed faster over the spectral regions containing features of interest. The increased speed allows acquiring multiple sweeps over the features of interest, which may be relatively small compared to the background. By averaging many such sweeps, assuming the noise on the spectra is random or Gaussian in nature, the SNR may be significantly enhanced. It is worth noting that interesting portions of the spectra may in fact be regions measured to determine the baseline level of the spectrum, against which the signal of interest may be compared.

Figure 26:
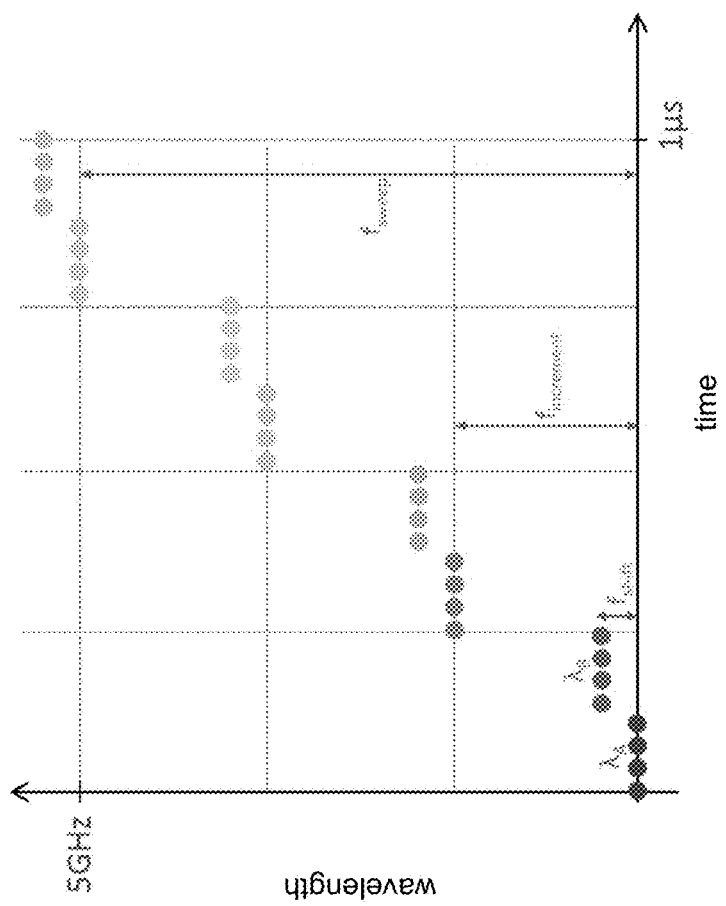
FIGS. 25-27 show exemplary waveforms having frequency steps and groups having a constant frequency.
Figure 25:
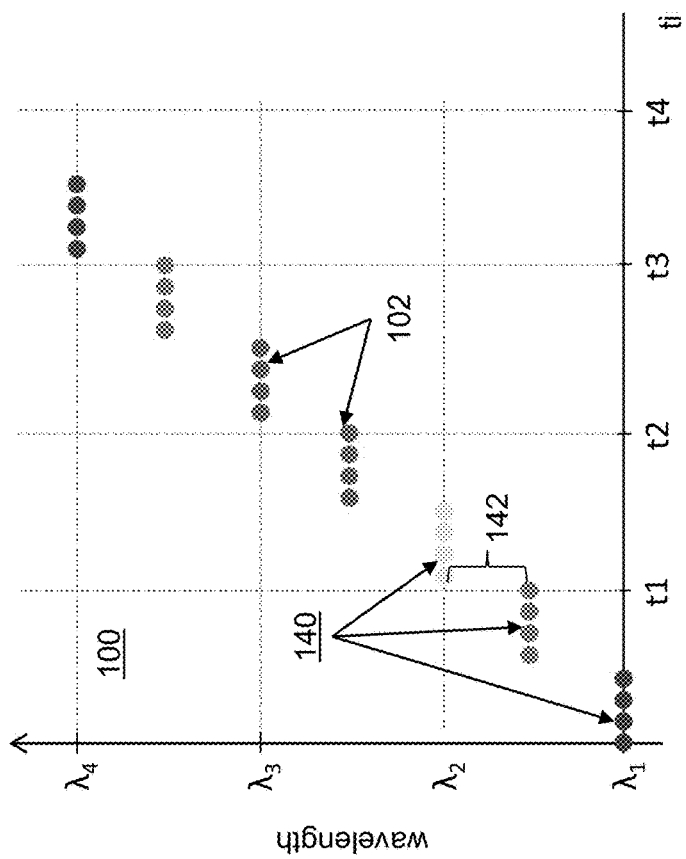

FIGS. 25 and 26 begin a series of waveforms that exemplify another application of digital frequency stepping+ hopping. The waveforms 100 shown in FIGS. 25 and 26 may be used in other fields, but have not heretofore been used in the optical domain (such as LiDAR). Here, an overall bandwidth is achieved using a series of high-speed discrete frequency hops, followed by frequency dwells (collectively, 'steps' of constant frequency). A monotonic increase in the frequency of each dwell results in the digital stepped frequency waveform shown. This is essentially a combination of linear frequency sweeping and frequency shift keying, and is an alternate way to implement a velocity measurement with the usual range measurement, along with improved multi-target discrimination.

Figure 27:
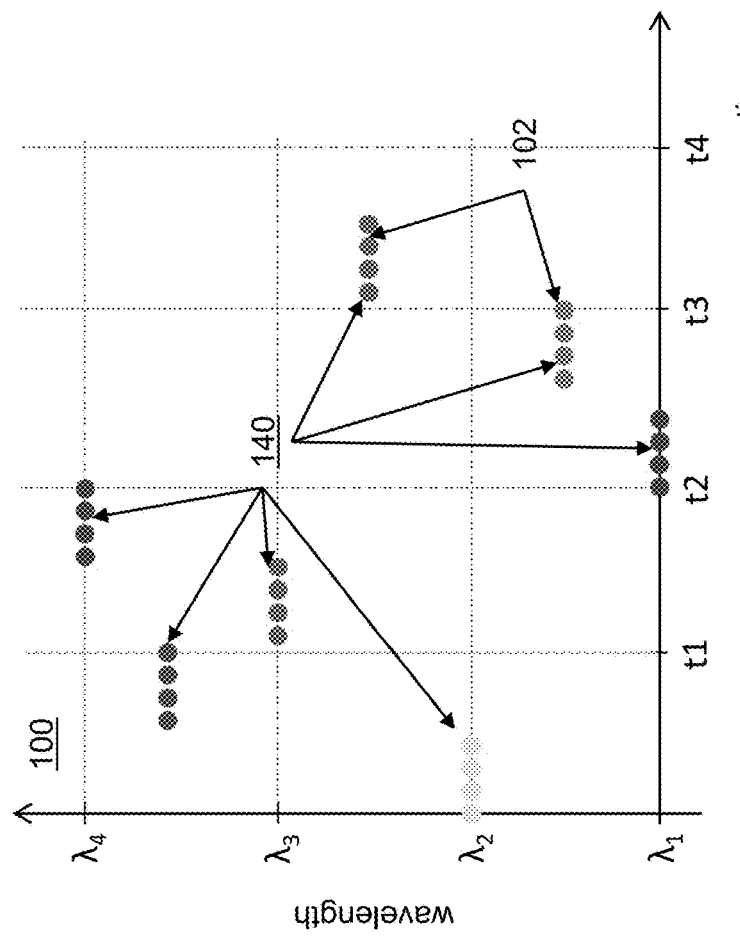

FIG. 27 is an encoded variation of FIG. 25—the same total bandwidth is covered in the 'sweep', except the frequency steps are chosen randomly in time from the set of available frequencies. This is known as a 'Costas coded' waveform. As with the encrypted waveforms 100 shown in previous figures, and for the exemplary situation of autonomous vehicles, each car has its own code (which could vary in time) based on the random pattern of frequency hops associated with this waveform, making it extremely unlikely that one car's LiDAR interferes with another car's LiDAR. Further, this adds an additional layer of security making it extremely difficult, if not impossible, for an adversarial attack into the car's LiDAR system. An attacker would have to know the random pattern of frequency hops a priori.

As will be understood by one of ordinary skill in the art, while this technique is described again with respect to autonomous vehicles, the above techniques are not limited to use with autonomous vehicles.

Figure 28:
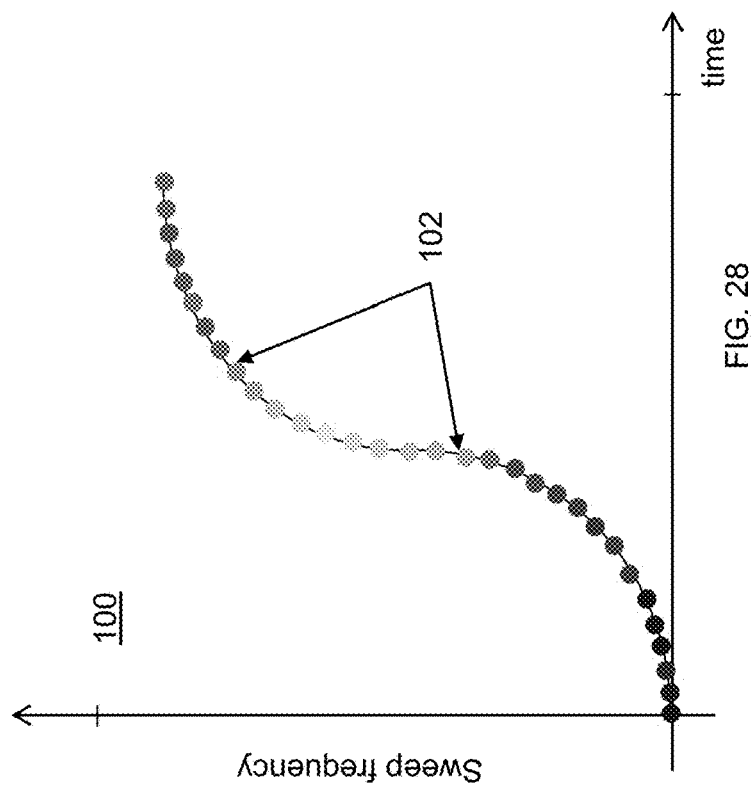
FIG. 28 shows a waveform having a non-linear frequency vs. time profile.

FIG. 28 depicts another example where Digital Coherent LiDAR can out-perform traditional LiDAR by using specifically nonlinear waveforms. FIG. 28 shows an exemplary situation with a 'sigmoidal' type curve (S-curve) for frequency sweeping rather than a linear frequency sweep. Modern digital signal processing techniques make such waveforms useful, and now software-controlled, programmable lasers combined with Digital Coherent LiDAR can take advantage of this processing power. As will be understood by one of ordinary skill in the art, waveform 100 could have an exponential, polynomial, sigmoidal, or other functional form.

The invention may also be performed as a method by the circuitry 44. That is, the method may be performed by circuitry for controlling the laser source configured to output electromagnetic radiation based on an input signal. The method includes supplying by the circuitry the input signal to the laser source to control the laser source to output a waveform including a plurality of output states, such that: (1) the laser source outputs electromagnetic radiation having a particular wavelength during the output states; (2) each of the plurality of output states is separated in time from neighboring output states of the plurality of output states by a time span; and (3) the particular wavelength of the electromagnetic radiation for a first output state of the plurality of output states is different from the particular wavelength of electromagnetic radiation for a second output state of the plurality of output states.

It should be appreciated that many of the elements discussed in this specification may be implemented in a hardware circuit(s), a processor executing software code or instructions which are encoded within computer readable media accessible to the processor, or a combination of a hardware circuit(s) and a processor or control block of an integrated circuit executing machine readable code encoded within a computer readable media. As such, the term circuit, module, server, application, or other equivalent description of an element as used throughout this specification is, unless otherwise indicated, intended to encompass a hardware circuit (whether discrete elements or an integrated circuit block), a processor or control block executing code encoded in a computer readable media, or a combination of a hardware circuit(s) and a processor and/or control block executing such code.

The use of "equal" or "constant" in the specification and claims should not be construed as absolutely equal or constant. That is, as will be understood by one of ordinary skill in the art, two values being equal or constant in the real world necessarily may include some small deviation. For example, the deviation may be less than 5%, less than 2%, less than 1%, or any other suitable measure. As an example, the deviation may depend on the real world circumstances.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the invention has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A coherent LiDAR system comprising:
a laser source configured to output electromagnetic radiation based on an input signal;
circuitry configured to supply the input signal to the laser source to control electromagnetic radiation output by the laser source, such that the laser source outputs a waveform including a plurality of output states, wherein:
the laser source outputs electromagnetic radiation having a particular wavelength during the output states;
each of the plurality of output states is separated in time from neighboring output states of the plurality of output states by a time span; and
the particular wavelength of the electromagnetic radiation for an output state of the plurality of output states differs from the particular wavelength of electromagnetic radiation for the neighboring output states;
wherein at least two of the neighboring output states are separated by a particular time span of less than 1 microsecond.

2. The system of claim 1, wherein a wavelength difference and the time span between neighboring output states are constant, such that the waveform is linear in time vs wavelength.

3. The system of claim 1, wherein:
the waveform includes a first sub-waveform and a second sub-waveform;

a first wavelength difference and the time span between neighboring output states of the first sub-waveform are constant, such that the first sub-waveform is linear in time vs wavelength;

a second wavelength difference and the time span between neighboring output states of the second sub-waveform are constant, such that the second sub-waveform is linear in time vs wavelength;

the first wavelength difference is positive and the second wavelength difference is negative.

4. The system of claim 3, wherein the first wavelength difference and an absolute value of the second wavelength difference are not equal.

5. The system of claim 1, wherein the combined optical and electrical response for the laser source is compensated so that the instantaneous wavelength between neighboring output states is linear.

6. The system of claim 1, wherein, during the time span separating each of the plurality of states, the laser source:
does not emit electromagnetic radiation; and/or
emits electromagnetic radiation having an amplitude at least 10 dB less than an amplitude of the electromagnetic radiation emitted during the output states.

7. The system of claim 1, wherein the frequency difference between neighboring output states is less than 10 GHz.

8. The system of claim 1, wherein the frequency difference between neighboring output states is less than 1 GHz.

9. The system of claim 1, wherein the frequency difference between neighboring output states is less than 100 MHz.

10. The system of claim 1, wherein a first time span separating a first two output states of the plurality of output states is different from a second time span separating a second two output states of the plurality of output states.

11. The system of claim 1, wherein a same time span separates each of the neighboring output states of the plurality of output states.

12. The system of claim 11, wherein:
the intragroup wavelength differences are zero, and
the extragroup wavelength differences are non-zero and constant across the neighboring groups.

13. The system of claim 1, wherein:
the plurality of output states are grouped into a plurality of output groups;
each of the plurality of output states is a member of an output group;
each member of each output group is separated from neighboring members of the output group by an intragroup wavelength difference;
each output group of the plurality of output groups is separated from neighboring output groups of the plurality of output groups by an extragroup wavelength difference; and
the extragroup wavelength difference is larger than the intragroup wavelength difference.

14. The system of claim 13, wherein the intragroup wavelength differences are constant, and the extragroup wavelength differences are constant.

15. The system of claim 13, wherein:
the intragroup wavelength differences are constant, and
the extragroup wavelength differences are not constant across the neighboring groups.

16. The system of claim 15, wherein the extragroup wavelength differences across the neighboring groups forms a specific time sequenced pattern and the time sequenced pattern is chosen from a larger set of possible time sequenced patterns.

17. The system of claim 16, wherein the specific time-sequenced pattern represents a unique code.

18. The system of claim 17, wherein the specific time-sequenced pattern of extragroup wavelength differences varies in time and represents a time-varying code.

19. The system of claim 1, wherein each output state of the plurality of output states has an equal amplitude.

20. The system of claim 1, wherein:
each output state of the plurality of output states has an amplitude; and
at least two output states of the plurality of output states have a different amplitude.

21. The system of claim 20, wherein the amplitude of each output state of the plurality of output states are configured such that a power vs. time profile of the waveform has a desired profile.

22. A method performed by circuitry for controlling a laser source configured to output electromagnetic radiation based on an input signal, the method comprising:
supplying by the circuitry the input signal to the laser source to control the laser source to output a waveform including a plurality of output states, such that
the laser source outputs electromagnetic radiation having a particular wavelength during the output states;
each of the plurality of output states is separated in time from neighboring output states of the plurality of output states by a time span; and
the particular wavelength of the electromagnetic radiation for an output state of the plurality of output states differs from the particular wavelength of electromagnetic radiation for the neighboring output states;
wherein at least two of the neighboring output states are separated by a particular time span of less than 1 microsecond.

23. The method of claim 22, wherein a wavelength difference and the time span between neighboring output states are constant, such that the waveform is linear in time vs wavelength.

24. The method of claim 22, wherein:
the waveform includes a first sub-waveform and a second sub-waveform;
a first wavelength difference and the time span between neighboring output states of the first sub-waveform are constant, such that the first sub-waveform is linear in time vs wavelength;
a second wavelength difference and the time span between neighboring output states of the second sub-waveform are constant, such that the second sub-waveform is linear in time vs wavelength;
the first wavelength difference is positive and the second wavelength difference is negative.

25. The method of claim 24, wherein the first wavelength difference and an absolute value of the second wavelength difference are not equal.

26. The method of claim 22, wherein, during the time span separating each of the plurality of states, the laser source:
does not emit electromagnetic radiation; and/or
emits electromagnetic radiation having an amplitude at least 10 dB less than an amplitude of the electromagnetic radiation emitted during the output states.

27. The method of claim 22, wherein the frequency difference between neighboring output states is less than 10 GHz.

28. The method of claim 22, wherein the frequency difference between neighboring output states is less than 1 GHz.

29. The method of claim 22, wherein the frequency difference between neighboring output states is less than 100 MHz.

30. The method of claim 22, wherein a first time span separating a first two output states of the plurality of output states is different from a second time span separating a second two output states of the plurality of output states.

31. The method of claim 22, wherein a same time span separates each of the neighboring output states of the plurality of output states.

32. The method of claim 22, wherein:
the plurality of output states are grouped into a plurality of output groups;
each of the plurality of output states is a member of an output group;
each member of each output group is separated from neighboring members of the output group by an intragroup wavelength difference;
each output group of the plurality of output groups is separated from neighboring output groups of the plurality of output groups by an extragroup wavelength difference; and
the extragroup wavelength difference is larger than the intragroup wavelength difference.

33. The system of claim 32, wherein the intragroup wavelength differences are constant, and the extragroup wavelength differences are constant.

34. The system of claim 32, wherein:
the intragroup wavelength differences are zero, and
the extragroup wavelength differences are non-zero and constant across the neighboring groups.

35. The system of claim 32, wherein:
the intragroup wavelength differences are constant, and
the extragroup wavelength differences are not constant across the neighboring groups.

36. The system of claim 35, wherein the extragroup wavelength differences across the neighboring groups forms a specific time sequenced pattern and the time sequenced pattern is chosen from a larger set of possible time sequenced patterns.

37. The system of claim 36, wherein the specific time-sequenced pattern represents a unique code.

38. The system of claim 37, wherein the specific time-sequenced pattern of extragroup wavelength differences varies in time and represents a time-varying code.

39. The method of claim 22, wherein each output state of the plurality of output states has an equal amplitude.

40. The method of claim 22, wherein:
each output state of the plurality of output states has an amplitude; and
at least two output states of the plurality of output states have a different amplitude.

41. The system of claim 40, wherein the amplitude of each output state of the plurality of output states are configured such that a power vs. time profile of the waveform has a desired profile.

* * * * *